(12) United States Patent
Kobayashi et al.

(10) Patent No.: US 7,534,500 B2
(45) Date of Patent: May 19, 2009

(54) TRANSPARENT ELECTROCONDUCTIVE FILM, METHOD FOR MANUFACTURE THEREOF, AND TOUCH PANEL

(75) Inventors: Taichi Kobayashi, Kodaira (JP); Hidefumi Kotsubo, Kodaira (JP); Yoshinori Iwabuchi, Kodaira (JP); Mitsuhiro Nishida, Kodaira (JP); Yukihiro Kusano, Roskilde (DK); Shingo Oono, Kodaira (JP); Masato Yoshikawa, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 640 days.

(21) Appl. No.: 10/491,568

(22) PCT Filed: Oct. 7, 2002

(86) PCT No.: PCT/JP02/10408

§ 371 (c)(1),
(2), (4) Date: Aug. 18, 2004

(87) PCT Pub. No.: WO03/032332

PCT Pub. Date: Apr. 17, 2003

(65) Prior Publication Data

US 2004/0265602 A1    Dec. 30, 2004

(30) Foreign Application Priority Data

| Oct. 5, 2001 | (JP) | ............................. 2001-309920 |
| Oct. 5, 2001 | (JP) | ............................. 2001-309921 |
| Oct. 5, 2001 | (JP) | ............................. 2001-309922 |
| Nov. 16, 2001 | (JP) | ............................. 2001-351543 |
| Nov. 16, 2001 | (JP) | ............................. 2001-351544 |
| Nov. 16, 2001 | (JP) | ............................. 2001-351800 |
| Nov. 16, 2001 | (JP) | ............................. 2001-351813 |
| Nov. 16, 2001 | (JP) | ............................. 2001-351827 |

(51) Int. Cl.
*B32B 18/00* (2006.01)
*B32B 27/08* (2006.01)
*B32B 27/18* (2006.01)
*B32B 15/08* (2006.01)
*G02F 1/1333* (2006.01)

(52) U.S. Cl. .............................. 428/457; 428/355 EN; 428/355 AC; 428/413; 428/418; 428/425.8; 428/425.9; 428/458; 428/461; 428/463; 428/469; 428/472; 428/473.5; 428/447; 428/450; 200/512; 200/514; 200/310; 349/12; 349/122; 354/104; 354/173

(58) Field of Classification Search ....................... None
See application file for complete search history.

(56) References Cited

U.S. PATENT DOCUMENTS 4,071,736 A * 1/1978 Kamerling .................. 219/219

(Continued)

FOREIGN PATENT DOCUMENTS

JP     58-009124     *    1/1983

(Continued)

*Primary Examiner*—Vivian Chen
(74) *Attorney, Agent, or Firm*—Sughrue Mion, PLLC

(57) ABSTRACT

A transparent conductive film comprising a polymer film and a transparent conductive layer provided thereon, especially a transparent conductive film improved in durability and mechanical and electrical properties, a process for the preparation thereof, and a touch panel provided with the transparent conductive film, as well as transparent conductive plate and the process for the preparation thereof. The transparent conductive film comprising a polymer film, an undercoat layer and a transparent conductive layer which are superposed in this order, and the undercoat layer contains a compound having at least one selected from an amino group and a phosphoric acid group.

26 Claims, 7 Drawing Sheets

U.S. PATENT DOCUMENTS

| | | | | |
|---|---|---|---|---|
| 4,920,254 | A * | 4/1990 | DeCamp et al. | 219/547 |
| 4,931,782 | A * | 6/1990 | Jackson | 345/174 |
| 4,952,783 | A * | 8/1990 | Aufderheide et al. | 219/528 |
| 5,009,928 | A * | 4/1991 | Hayashi et al. | 427/126.3 |
| 5,225,273 | A * | 7/1993 | Mikoshiba et al. | 428/323 |
| 5,448,037 | A * | 9/1995 | Takase et al. | 219/547 |
| 5,939,188 | A * | 8/1999 | Moncur et al. | 428/332 |
| 6,063,479 | A * | 5/2000 | Yoshikawa et al. | 428/192 |
| 6,136,444 | A * | 10/2000 | Kon et al. | 428/423.1 |
| 6,171,663 | B1 * | 1/2001 | Hanada et al. | 349/139 |
| 6,411,344 | B2 * | 6/2002 | Fujii et al. | 349/12 |
| 6,480,250 | B1 * | 11/2002 | Matsufuji et al. | 349/113 |
| 6,590,622 | B1 * | 7/2003 | Nakanishi et al. | 349/12 |
| 6,603,085 | B2 * | 8/2003 | Oya et al. | 200/512 |
| 6,627,918 | B2 * | 9/2003 | Getz et al. | 257/59 |
| 6,629,833 | B1 * | 10/2003 | Ohya et al. | 425/458 |
| 6,881,357 | B2 * | 4/2005 | Lee et al. | 252/511 |
| 6,903,729 | B2 * | 6/2005 | Nakanishi et al. | 345/173 |
| 6,958,748 | B1 * | 10/2005 | Fukui et al. | 345/173 |
| 6,965,191 | B2 * | 11/2005 | Koike et al. | 313/112 |
| 2001/0055673 | A1 * | 12/2001 | Getz | 428/212 |
| 2002/0031622 | A1 * | 3/2002 | Ippel et al. | 428/1.6 |

FOREIGN PATENT DOCUMENTS

| | | | |
|---|---|---|---|
| JP | 61-010443 | * | 1/1986 |
| JP | 62-061203 | * | 3/1987 |
| JP | 05-156426 | * | 6/1993 |
| JP | 05-313001 | * | 11/1993 |
| JP | 07-325313 | * | 12/1995 |
| JP | 09-262928 | * | 7/1997 |
| JP | 09-254303 | * | 9/1997 |
| JP | 09-262928 | * | 10/1997 |

* cited by examiner

TRANSPARENT ELECTROCONDUCTIVE FILM, METHOD FOR MANUFACTURE THEREOF, AND TOUCH PANEL

BACKGROUND OF INVENTION

1. Field of the Invention

The present invention relates to a transparent conductive film having a polymer film and a transparent conductive layer provided thereon, especially a transparent conductive film improved in durability and mechanical and electrical properties, a process for the preparation thereof, and a touch panel provided with the transparent conductive film, as well as transparent conductive plate and the process for the preparation thereof.

2. Description of the Related Art

A touch panel according to resistance sensitive system, in which signals are input by pushing a panel with a fingertip or pen and bringing the panel in contact with an opposite electrode to turn on electricity, is advantageous to enable reduction of the size, weight or thickness. Therefore, the touch panel is widely used in input equipments of various home appliances and portable terminals.

The touch panel according to resistance sensitive system has a structure that an upper electrode comprising a polymer base film, an undercoat layer and a transparent conductive layer superposed in this order is laminated on a lower electrode comprising a plastic or glass thick plate and a transparent electrode formed thereon through spacers, such that the transparent conductive layer and transparent electrode face each other. When a display surface of the upper electrode is pushed with a fingertip or pen, the surface comes in contact with an opposite electrode to turn on electricity. Generally, a hard coat layer is formed on the display surface of the upper electrode to protect the polymer base film.

The undercoat layer is generally provided to improve bonding strength between the polymer (base) film and transparent conductive layer and prevent peeling of the transparent conductive layer caused by repetition of the pushing.

As the transparent conductive layer usable in the touch panel, for example, JA60-131711 describes a transparent conductive layer subjected to an annealing treatment to improve mechanical and chemical properties, the layer being provided on an undercoat layer of organic silicon compound. JA02-66809 describes a composite of a substrate, an adhesive layer, a substrate and a transparent conductive layer, in which the adhesive layer serves to relax the stress applied to the transparent conductive layer.

SUMMARY OF THE INVENTION

It has revealed that the undercoat layer described in JA02-66809 does not bring about satisfactory bonding strength between the polymer film and transparent conductive layer and therefore the transparent conductive layer is apt to be exfoliated when it undergoes a durability test by writing. Hence, a touch panel provided with the transparent conductive layer is lowered in the electrical properties and deteriorated in the appearance.

In view of the above-mentioned problems, the object of the present invention is to provide a transparent conductive film having improved bonding strength (adhesion) between a transparent conductive layer and an undercoat layer, and showing excellent mechanical properties, electrical properties and durability, and a touch panel provided with the transparent conductive film (first and second inventions).

Further, the composite using the adhesive layer described in JA02-66809 uses polyurethane or rubber as an adhesive. According to study of the present inventors, however, the touch panel having the composite did not show a sufficient durability. In more detail, when a surface of an upper electrode prepared using the composite repeatedly undergoes input operation by a pen or fingertip, the transparent electrode generates crack and peeling from the polymer film in course of time. The damage such as the crack or peeling reduces the electrical properties such as uniformity of electrical resistance values (resistivities), and hence does not bring out the excellent durability. According to further study of the present inventors, it has been revealed that the damage is frequently caused by insufficient bonding strength between an adhesive layer and a PET (polyethylene terephthalate) film usually employed as a substrate for a composite of substrate/adhesive layer/substrate.

The object of the present invention is to provide a touch panel in which the above problems are solved, and in which peeling between a transparent conductive layer and an undercoat layer does not occur and the transparent conductive layer is not damaged even for long-term use to show excellent durability, and further which can be easily prepared, and further to provide a transparent conductive plate usable for preparing the touch panel (a third invention).

The touch panel provided with the upper and lower electrodes using the same kind of transparent conductive layer described in JA02-66809 does not show excellent durability because resistance to scratching of the transparent conductive layer on the polymer film as the upper electrode is poor.

As for the electrode for the touch panel, JA02-194943 describes that a transparent conductive layer of ITO (tin indium oxide) is formed and then the ITO is subjected to heat treatment to be crystallized in order to improve the durability as above. However, the transparent conductive layer is a polymer film, which is restricted in enhancement of heat resistance. Further, it is necessary to conduct the heat treatment at 150° C. for a relative long time period to enhance the heat resistance, which results in disadvantage in terms of productivity and cost.

The present inventors have eagerly studied to improve the durability of the upper and lower electrodes, and consequently found that, in the upper and lower electrodes using the same kind of transparent conductive layer, the repetition of input operation with a pen or fingertip generates fusing between the upper and lower electrodes and further produces crack and peeling of the transparent conductive layer from the polymer film in course of time. The damage such as the crack or peeling reduces the electrical properties such as uniformity of electrical resistance values, and hence does not bring out the excellent durability.

The object of the present invention is to provide a transparent conductive film in which the above problems are solved, and which is not damaged even for long-term use to show excellent durability, and further which can be easily prepared, and further to provide a process for the preparation of this film (a forth invention).

Moreover, the touch panel according to resistance sensitive system needs a transparent conductive layer having high electrical resistance (500Ω/□). ITO has a low volume resistivity, and therefore it is necessary to reduce a thickness of the ITO for obtaining the transparent conductive layer of high resistivity. However, it is difficult to control the resistivity in case the thickness of film is reduced.

The object of the present invention is to provide a transparent conductive layer in which the above problems are solved, and which is not damaged even for long-term use and prevents fusing to the lower electrode and further has good grinding resistance and excellent durability, and furthermore of which thickness and electrical resistance can be easily controlled, and further to provide a process for the preparation of this film (a fifth invention).

Further, the object of the present invention is to provide a touch panel provided with any of the above transparent conductive films.

Furthermore, as mentioned above, according to study of the present inventors, it has been revealed that the composite prepared by using the adhesive layer described in JA02-66809 shows insufficient durability and therefore occurrence of crack and peeling of the transparent electrode from the polymer film in course of time. The damage such as the crack or peeling reduces the electrical properties such as uniformity of electrical resistance values, and hence does not bring out the excellent durability. According to further study of the present inventors, it has been revealed that the damage is frequently caused by insufficient bonding strength between an adhesive layer and a PET (polyethylene terephthalate) film usually employed as a substrate for a composite of substrate/adhesive layer/substrate.

The object of the present invention is to provide a touch panel in which the above problems are solved, and which does not suffer from peeling between the polymer film and the adhesive layer even for long-term use and further damage of the transparent conductive film, and which has excellent durability, and further to provide a transparent conductive film useful in the touch panel, and furthermore to provide the transparent conductive plate useful in the touch panel and a process for the preparation of this plate (a sixth invention).

As described previously, the object of the present invention (the first to sixth inventions) is to provide a transparent conductive film, a transparent conductive plate, a process for the preparation of these and a touch panel using these film or panel, which are improved in durability.

The above objects are attained by the following inventions:

The firs t invention is provided by a transparent conductive film comprising a polymer film, an undercoat layer and a transparent conductive layer which are superposed in this order, wherein the undercoat layer contains a compound having at least one selected from an amino group and a phosphoric acid group.

By using the transparent conductive film provided the undercoat layer containing the amino group and a phosphoric acid group, the resultant touch panel is improved in bonding strength between the undercoat layer and transparent conductive layer, free from occurrence of peeling or falling of the transparent conductive layer from the polymer film, and shows excellent durability.

In the first invention, the transparent conductive layer preferably comprises at least one selected from indium oxide, tin oxide, zinc oxide, indium oxide-tin oxide (ITO; i.e., indium-doped tin oxide), antimony oxide-tin oxide (ATO; i.e., antimony-doped tin oxide), and zinc oxide-aluminum oxide (ZAO; i.e., aluminum-doped zinc oxide). Especially preferred is indium oxide-tin oxide (ITO).

The compound having amino group is preferably derived from a compound selected from dialkylaminoalkyl methacrylate and a silane-coupling agent having an amino group, and the compound having phosphoric acid group is preferably derived from a compound selected from 2-methacryloyloxy-ethyl phosphate and dipehnyl-2-methacryloyloxyethyl phosphate.

A protective layer comprising a polymeric compound is preferably provided on the transparent conductive layer (the preferred embodiments are described later).

The transparent conductive film has preferably a structure wherein a polymer film having a transparent conductive layer thereon through an undercoat layer and another polymer film having a hardcoat layer thereon, the two polymer films being bonded to each other through an adhesive layer comprising polyolefin resin such that a surface having no transparent conductive layer of the polymer film and a surface having no hardcoat layer of another polymer film face each other (the preferred embodiments are described later).

The transparent conductive layer generally comprises a first transparent conductive layer comprising a first metal oxide and a second transparent conductive layer comprising a second metal oxide, and the second transparent conductive layer is formed under the condition different from the condition for forming the second transparent conductive layer (the preferred embodiments are described later).

It is preferred that the hardcoat layer is provided on a surface having no transparent conductive layer of the polymer film, and that the polymer film comprises polyethylene terephthalate.

When signals are input onto the touch panel by pushing it with a pen or fingertip, the upper electrode receives increased force compared with the lower electrode to deform whereby falling and peeling of the transparent conductive layer are apt to occur. Therefore the transparent conductive layer of the invention free from falling and peeling is preferably used in the upper electrode.

Hence, the first invention is provided by a touch panel comprising an upper electrode having a hard coat layer, a first polymer film, a first undercoat layer and a first transparent conductive layer superposed in this order, and a lower electrode having a plastic or glass plate, a second polymer film, a second undercoat layer and a second transparent conductive layer superposed in this order, the upper electrode and the lower electrode being bonded to each other through spacers such that both of the transparent conductive layers face each other, wherein the upper electrode and/or the lower electrode includes the transparent conductive film as described above.

As mentioned above, the transparent conductive film having a first polymer film, a first undercoat layer and a first transparent conductive layer can be employed as an upper electrode of the touch panel.

Further, a composite of the transparent conductive film of the invention and a plastic or glass plate can be employed as a lower electrode of the touch panel. Moreover, a touch panel having excellent durability can be obtained by using the transparent conductive film of the invention in the upper and/or lower electrodes.

The lower electrode preferably has a transparent plate, an adhesive layer, a polymer film and a (second) transparent conductive layer superposed in this order, the adhesive layer comprising polyolefin resin (the preferred embodiments are described later). Further, the first transparent conductive layer of the upper electrode is preferably formed from material different from the second transparent conductive layer of the lower electrode (the preferred embodiments are described later).

The second invention is provided by a transparent conductive film having a polymer film and a transparent conductive layer provided thereon, wherein a protective layer comprising a polymeric compound is formed on the transparent conductive layer.

By forming protective layer comprising a polymeric compound on the transparent conductive layer, the resultant touch panel is free from occurrence of peeling or falling of the transparent conductive layer from the polymer film, and hence shows excellent durability.

The polymeric compound is preferably one or more resin selected from acrylic resin, polyester resin, epoxy resin, urethane resin, phenol resin, maleic acid resin, melamine resin, urea resin, polyimide resin and silicon-containing resin. The resin is preferably silicon-containing resin, and those containing an amino group. Further, of these resins, preferred are thermosetting resins. The polymeric compound preferably is alkoxy-silane containing an amino group. Hence, the protective layer is especially preferred to be a cured layer formed by curing alkoxy-silane containing an amino group.

Further, the protective layer preferably is a cured layer formed by curing UV-curable resin, whereby the formation of the layer can be carried out for a short time period.

The protective layer comprising a polymeric compound is generally an extremely thin layer that does not have influence on conductivity in the direction perpendicular to the surface of the layer. The thickness preferably is 1 to 1,000 nm, especially 1 to 100 nm.

The transparent conductive layer preferably is an indium-doped tin oxide (ITO). The hard coat layer is preferably formed on the polymer film to protect the film. The undercoat layer is preferably formed between the transparent conductive layer and the polymer film to enhance the bonding strength between the transparent conductive layer and the polymer film and prevent falling and peeling of the transparent conductive layer. The polymer film preferably is a polyethylene terephthalate (PET) film.

When signals are input onto the touch panel by pushing it with a pen or fingertip, the upper electrode receives increased force compared with the lower electrode to deform whereby falling and peeling of the transparent conductive layer are apt to occur. Therefore the transparent conductive layer of the invention free from falling and peeling is preferably used in the upper electrode.

Thus, the transparent conductive film of the invention comprising the polymer film, the transparent conductive layer and the protective layer comprising a polymeric compound can be employed as an upper electrode of the touch panel. Further the combination of the transparent conductive film with a plastic or glass plate can be employed as a lower electrode. Moreover, a touch panel obtained by using the transparent conductive film of the invention in the upper and/or lower electrodes shows excellent durability.

The third invention is provided by a transparent conductive film comprising a first polymer film having a transparent conductive layer provided thereon, and a second polymer film having a hard coat layer provided thereon, the two polymer films being bonded to through an adhesive layer such that two surfaces having no layer of the two polymer films face each other.

The polyolefin resin of the adhesive layer preferably comprises copolymer of ethylene and vinyl acetate and/or (meth)acrylate. Further, the polyolefin resin of the adhesive layer preferably comprises a film formed by curing copolymer of ethylene and vinyl acetate and/or (meth)acrylate, the curing generally being crosslinking by thermal polymerization or photopolymerization. Thereby the adhesive layer becomes tough to be improved in durability. Modulus of elasticity of the tough adhesive layer generally is $1 \times 10^3$ to $1 \times 10^7$ Pa, preferably $1 \times 10^3$ to $1 \times 10^6$ Pa, especially $1 \times 10^4$ to $1 \times 10^5$ Pa.

Both or one of the polymer films preferably comprise polyethylene terephthalate, whereby the durability is improved.

The transparent conductive layer preferably comprises at least one selected from indium oxide, tin oxide, zinc oxide, indium-doped tin oxide (ITO), antimony-doped tin oxide (ATO), and aluminum-doped zinc oxide. Especially preferred is indium oxide-tin oxide (ITO). Thereby the layer has excellent conductive properties.

The undercoat layer is preferably provided between the polymer film and the transparent conductive layer. Further, the protective layer is preferably provided on the transparent conductive layer, whereby the durability is further improved.

The invention is also provided by a touch panel comprising an upper electrode which comprises a first polymer film having a first transparent conductive layer thereon and a second polymer film having a hard coat layer thereon, the first and second films being bonded to each other through an adhesive layer such that both of the reverse sides face each other, and a lower electrode which comprises a plastic or glass plate (transparent plate), a polymer film and a transparent conductive layer superposed in this order, the upper electrode and the lower electrode being bonded to each other through spacers such that both of the transparent conductive layers face each other, wherein the upper electrode includes any of the above-mentioned conductive films.

When signals are input onto the touch panel by pushing it with a pen or fingertip, the upper electrode receives increased force compared with the lower electrode to deform whereby falling and peeling of the transparent conductive layer are apt to occur. Provision of an adhesive layer enables relaxation the received force (load). However, the load is apt to reduce bonding force between the plastic plate and the polymer film. The adhesive layer of the invention combines the above relaxation with good bonding force between the plastic plate and the polymer film. Therefore the transparent conductive film having the adhesive layer which is free from falling and peeling of the transparent conductive layer and reduction of the bonding force and which has excellent durability is preferably used in the upper electrode. Hence, the use of the transparent conductive layer in the upper electrode brings about a touch panel having excellent.

The forth invention is provided by the transparent conductive film which can prevent fusing between the upper and lower electrodes, has excellent mechanical properties and good grinding resistance, and is free from falling and peeling of the metal oxide, which can be obtained by forming a usual metal oxide layer on a polymer film, and then forming another metal oxide layer different in oxygen content, nitrogen content, crystalline state and surface shape (surface roughness) from the usual metal oxide layer on the usual metal oxide layer.

In more detail, the forth invention lies in a transparent conductive film comprising a polymer film and transparent conductive layer comprising metal oxide formed thereon by a vapor deposition process, wherein the transparent conductive layer comprises a first transparent conductive layer comprising a first metal oxide and a second transparent conductive layer comprising a second metal oxide, and the second transparent conductive layer is formed under the condition different from the condition for forming the first transparent conductive layer.

In the film, the transparent conductive layer preferably comprises indium-doped tin oxide (ITO), aluminum-doped zinc oxide (ZAO) or antimony-doped tin oxide (ATO).

The first and second transparent conductive layers are formed by a vapor deposition process selected from a sputtering process and a reactive sputtering process, especially the reactive sputtering process.

A target material used in the vapor deposition process preferably is a ceramic target formed by sintering mixed metal oxides or an alloy target made of metal oxide.

The second transparent conductive layer comprising the second metal oxide is preferably different from the first transparent conductive layer comprising the first metal oxide in at least one property selected from oxygen content, nitrogen content, crystalline state and surface shape.

The condition for forming the second transparent conductive layer comprising the second metal oxide by a sputtering process is preferably different in pressure and deposition rate in the sputtering from that of the first transparent conductive layer comprising the first metal oxide.

In the transparent conductive film comprising a polymer film and transparent conductive layer comprising metal oxide formed thereon, wherein the transparent conductive layer comprises a first transparent conductive layer comprising a first metal oxide and a second transparent conductive layer comprising a second metal oxide (the forth invention), it is preferred that the second transparent conductive layer is different in oxygen content different from the first transparent conductive layer.

Further, in the transparent conductive film comprising a polymer film and transparent conductive layer comprising metal oxide formed thereon, wherein the transparent conductive layer comprises a first transparent conductive layer comprising a first metal oxide and a second transparent conductive layer comprising a second metal oxide (the forth invention), it is preferred that the second transparent conductive layer is different in nitrogen content different from the first transparent conductive layer.

The transparent conductive layer comprising metal oxide preferably is an ITO layer.

The forth invention is also provided by a touch panel comprising the above transparent conductive layer and a lower electrode having transparent plate (plastic or glass plate) and a polymer film provided with a transparent conductive layer superposed in this order, the transparent conductive film and the lower electrode being bonded to each other through spacers such that both of the transparent conductive layers face each other.

The forth invention is further provided by a process for the preparation of the above transparent conductive film comprising the steps of:

forming the first transparent conductive layer comprising the first metal oxide onto the polymer film by a vapor deposition process, and forming the second transparent conductive layer comprising the second metal oxide onto the first transparent conductive layer by a vapor deposition process under the condition different from that for forming the first transparent conductive layer.

The preferred embodiments of the transparent conductive film can be applied to the above process. Examples of the metal oxides include, in addition to the metal oxides mentioned above, indium oxide, antimony oxide, cadmium oxide and GZO.

The fifth invention of the present invention is provided by a transparent conductive plate comprising a transparent plate, an adhesive layer, a polymer film and a transparent conductive layer superposed in this order, wherein the adhesive layer comprises polyolefin resin.

The polyolefin resin of the adhesive layer preferably comprises copolymer of ethylene and vinyl acetate and/or (meth) acrylate. Further, the adhesive layer of the polyolefin resin preferably comprises a film formed by curing copolymer of ethylene and vinyl acetate, the curing generally being crosslinking by thermal polymerization or photopolymerization. Thereby the adhesive layer becomes tough to be improved in durability. Modulus of elasticity of the tough adhesive layer generally is $1\times10^3$ to $1\times10^7$ Pa, preferably $1\times10^3$ to $1\times10^6$ Pa, especially $1\times10^4$ to $1\times10^5$ Pa.

The polymer film may be any film as long as it is transparent. Preferred examples of the film include optical films such as polyethylene terephthalate (PET), acrylic resin, polycarbonate, and triacetyl cellulose films. Thereby, the transparent conductive plate is improved in durability.

The transparent conductive layer preferably comprises at least one selected from indium oxide, tin oxide, zinc oxide, indium-doped tin oxide (ITO), antimony-doped tin oxide (ATO), and aluminum-doped zinc oxide (ZAO). Thus the transparent conductive layer has good electrically-conductive properties.

The undercoat layer (mentioned above) is preferably formed between the polymer film and transparent conductive layer. On the transparent conductive layer, the protective layer (mentioned above) is preferably provided. Thereby, the transparent conductive plate is improved in durability. The transparent plate is generally a plastic or glass plate. Preferred examples of the plastic plate include acrylic resin (especially polymethyl methacrylate), polycarbonate, polystyrene, polyolefin and amorphous polyolefin. The plastic plate is excellent in impact resistance compared with the glass plate.

The invention also lies in a touch panel comprising an upper electrode having a polymer film and a transparent conductive layer provided thereon, and a lower electrode having a transparent plate, an adhesive layer, a polymer film and a transparent conductive layer superposed in this order, the upper electrode and the lower electrode being bonded to each other through spacers such that both of the transparent conductive layers face each other, wherein the lower electrode includes the transparent conductive plate described above When signals are input onto the upper electrode of touch panel by pushing it with a pen or fingertip, the upper electrode receives increased force (load) to deform while the lower electrode also indirectly receives the force. Therefore in the lower electrode, falling and peeling of the transparent conductive layer are also apt to occur. Provision of an adhesive layer enables relaxation of the received force (load). However, the load is apt to reduce bonding force between the plastic plate and the polymer film. The adhesive layer of the invention combines the above relaxation with good bonding force between the adhesive layer and the transparent plate and between the adhesive layer and the polymer film. Therefore the adhesive layer is free from falling and peeling of the transparent conductive layer, and peeling between the transparent plate and the polymer film, and further has excellent durability. Thus, it is preferred that the transparent conductive plate having the adhesive layer is used in the upper electrode.

Hence, the use of the transparent conductive plate of the invention as the lower electrode brings about a touch panel having excellent.

Moreover, the above transparent conductive (plastic) plate, which comprises a transparent plastic plate, an adhesive layer, a polymer film and a transparent conductive layer, can be advantageously prepared by a process comprising the steps of:

applying a material for forming an adhesive layer onto a surface having no transparent conductive layer of a polymer film provided with the transparent conductive layer, introducing the polymer film provided with the adhesive layer into a mold for molding such that the transparent conductive layer faces a surface of the mold and injection molding a resin for forming a transparent plastic plate in the mold provided with the polymer film to incorporate the polymer film and the resin.

The process can be also applied to the transparent conductive plastic plate using an adhesive other than polyolefin.

The sixth invention is provided by a touch panel having excellent mechanical properties and free from falling and peeling of the transparent conductive layer, which has a future that a first transparent conductive layer of an upper electrode is formed from material different from that of a second transparent conductive layer of a lower electrode whereby physical and chemical affinity between the upper and lower electrodes is interrupted.

In the touch panel, the first and second transparent conductive layers generally are a film of metal oxide, a film of combination of two or more metal oxides or a composite film mainly consisting of metal oxide, or a film comprising gold, copper, nickel, aluminum or palladium. The first and second transparent conductive layers preferably are a composite film of two or more of metal oxides. Further, the first transparent conductive layer is preferably formed from materials different in at least one material from the second transparent conductive layer.

The first and second transparent conductive layers preferably comprise at least one selected from indium oxide system, zinc oxide system, tin oxide system, antimony oxide system and cadmium oxide system. Further, the first and second transparent conductive layers preferably comprise sintered material of indium oxide-tin oxide (ITO), sintered material of indium oxide-zinc oxide (IZO), sintered material of antimony oxide-tin oxide (ATO), and gallium-doped zinc oxide (GZO). It is especially preferred that one of the transparent conductive layers is ITO while the other is IZO.

The first and second transparent conductive layers are preferably formed by a physical vapor deposition selected from a vacuum vapor deposition process, a sputtering process, an ion plating process and a laser ablation process. The first and second transparent conductive layers are preferably formed by a chemical vapor deposition.

DETAILED DESCRIPTION OF THE INVENTION

Embodiments of the invention are explained in detail by referring to drawings.

Figure 1:
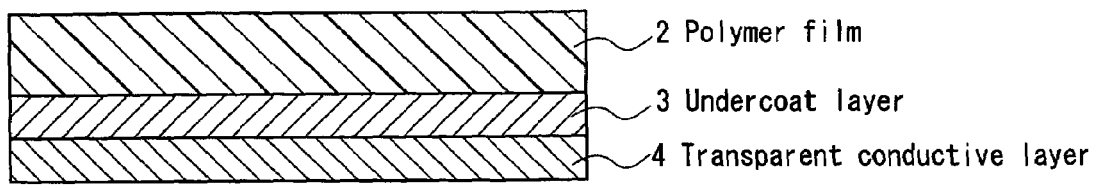
FIG. 1 is a section view showing an example of the transparent conductive film of the first invention according to the present invention.

FIG. 1 is a section view showing an example of the transparent conductive film of the first invention according to the present invention.

In the transparent conductive film of the invention, an undercoat layer 3 and a transparent conductive layer 4 are superposed in this order on one side of a polymer film 2. Provision of the undercoat layer 3 of the invention brings about enhancement of bonding strength between the transparent conductive layer 4 and the undercoat layer 3, whereby the transparent conductive layer 4 is prevented from falling or peeling from the undercoat layer 3.

Figure 2:
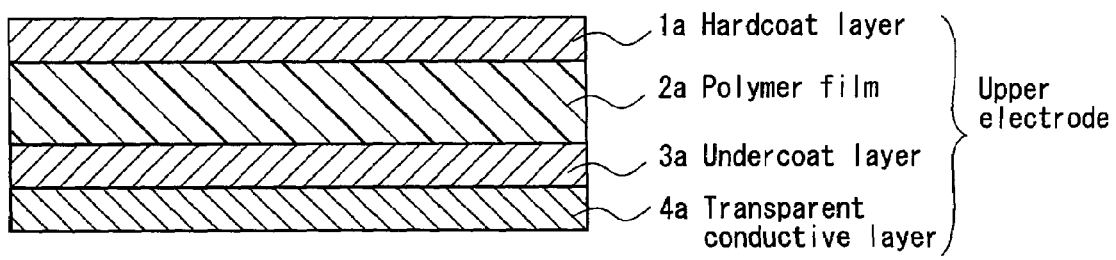
FIG. 2 is a section view showing an example of the touch panel in which the transparent conductive film of the first invention is used in the upper and lower electrodes.
Figure 2:
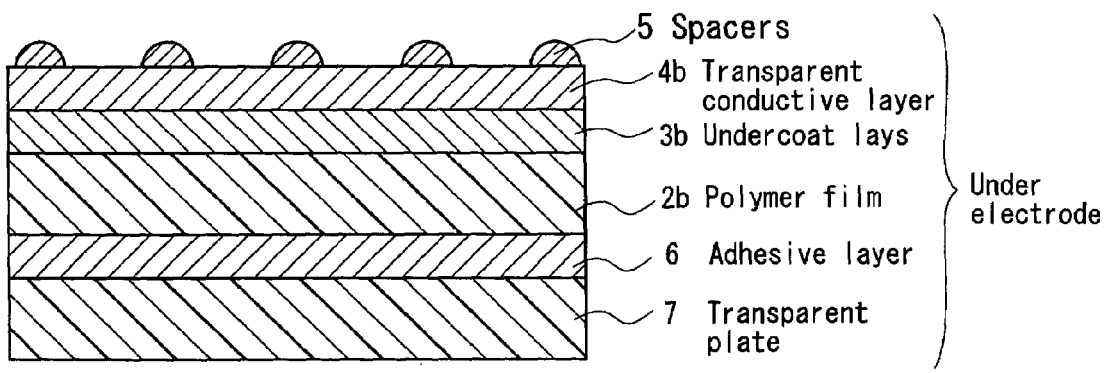

FIG. 2 is a section view showing an example of the touch panel in which the transparent conductive film the first invention is used in the upper and lower electrodes. In FIG. 2, the transparent conductive film is fused as an upper electrode. A hardcoat layer 1a is provided on one side of a polymer film 2a, and an undercoat layer 3a and a transparent conductive layer 4a are superposed in this order on the other side of the polymer film 2a. Though the hardcoat layer 1a may be not provided, it is preferably provided to protect the polymer film 2a. Further, a protect layer can be provided on the transparent conductive layer 4a.

In FIG. 2, the transparent conductive film is also used as a lower electrode. An undercoat layer 3b and a transparent conductive layer 4b are superposed in this order on one side of the polymer film 2b, and spacers 5 are formed on the transparent conductive layer 4b. A transparent plate such as a plastic plate (e.g., acrylic resin or polycarbonate plate) or a glass plate is bonded to the other side of the polymer film 2b through an adhesive layer 6.

Examples of materials of the polymer film 2, 2a, 2b include polyester such as polyethylene terephthalate (PET) and polybutylene terephthalate, acrylic resin such as polymethyl methacrylate (PMMA), polycarbonate (PC), polystyrene, cellulose triacetate (TAC), polyvinyl alcohol, polyvinyl chloride, polyvinylidene chloride, polyethylene, ethylene-vinyl acetate copolymer, polyvinyl butyral, metal-crosslinked polyethylene, copolymer of methacrylic acid, polyurethane and cellophane. Preferred are PET, PC, PMMA and TAC, especially PET, in terms of the toughness.

A thickness of the polymer film, though depending upon the use of the transparent conductive film, is generally in the range of 13 μm to 0.5 mm in the case of using as the upper electrode of touch panel. When the film has the thickness of less than 13 μm, the upper electrode having the film does not show sufficient durability. When the film has the thickness of more than 0.5 mm, the resultant touch panel has increased thickness per se to injure the flexibility.

In case the transparent conductive film is used as the lower electrode, the thickness of the polymer film used in the lower electrode can be set to the range more than the above range, for example in the range of 0.5 to 2 mm. However, the polymer film may have the same thickness as in the upper electrode because the film can be bonded to a plastic plate as mentioned later.

Examples of materials of the transparent conductive layer 4, 4a, 4b provided on the polymer film 2, 2a, 2b include indium oxide, tin oxide, zinc oxide, indium oxide-tin oxide (ITO), antimony oxide-tin oxide (ATO), zinc oxide-aluminum oxide (ZAO), and $SnO_2$. Especially preferred is ITO.

When a thickness of the transparent conductive layer 4, 4a, 4b is too small, the layer cannot have sufficient conductivity. When the thickness is too large, the transparent conductive layer cannot have enhanced conductivity corresponding to the increase thickness and suffers from increased cost for forming film and increased thickness of the transparent conductive film. Thus, the thickness of the transparent conductive layer 4, 4a, 4b preferably is in the range of 1 to 500 nm, especially 5 to 100 nm.

Though the transparent conductive layer 4, 4a, 4b can be formed according to a conventional process, it is preferred to form the layer by a sputtering process.

In the transparent conductive film, the hardcoat layer 1a may be provided on one side of a polymer film 2a, the side having no undercoat layer 3a and transparent conductive layer 4a. Examples of the hardcoat layer 1a include an acrylic resin layer, an epoxy resin layer, a urethane resin layer, and a silicone resin layer. The thickness generally is 1 to 50 μm.

Examples of materials used in the undercoat layer 3, 3a, 3b include thermosetting resin and photo-curable resin containing at least one of an amino group and a phosphoric group.

Examples of the thermosetting resin include phenol resin, resorcinol resin, urea resin, melamine resin, epoxy resin, acrylic resin, urethane resin, furan resin and silicone resin, which contain an amino group and a phosphoric group. The amino group and phosphoric group can be introduced into a main component or a hardener of the thermosetting resin.

Examples of the photo-curable resins (or compounds) include (meth)acrylate monomers such as 2-hydroxyethyl (meth)acrylate, 2-hydroxyropyl(meth)acrylate, 4-hydroxybutyl(meth)acrylate, 2-ethylhexylpolyethoxy(meth)acrylate, benzyl(meth)acrylate, isobornyl (meth)acrylate, phenyloxyethyl(meth)acrylate, tricyclodecane mono(meth)acrylate, dicyclopentenyloxyethyl(meth)acrylate, tetrahydrofurfuryl (meth)acrylate, acryloylmorpholine, N-vinylcaprolactam, 2-hydroxy-3-phenyloxypropyl(meth)acrylate, o-phenylphenyloxyethyl (meth)acrylate, neopentylglycol di(meth)acrylate, neopentyl glycol dipropoxy di(meth)acrylate, neopentyl glycol hydroxypivalate di(meth)acrylate, tricyclodecanedimethylol di(meth)acrylate, 1,6-hexanediol di(meth)acrylate, nonanediol di(meth)acrylate, trimethylolpropane tri(meth)acrylate, pentaerythritol tri(meth)acrylate, pentaerythritol tetra(meth)acrylate, tris[(meth)acryloxyethyl]isocyanurate and ditrimethylolpropane tetra(meth)acrylate; and the following (meth)acrylate oligomer such as:

polyurethane (meth)acrylate such as compounds obtained by reaction among the following polyol compound and the following organic polyisocyanate compound and the following hydroxyl-containing (meth)acrylate:

the polyol compound (e.g., polyol such as ethylene glycol, propylene glycol, neopentyl glycol, 1,6-hexanediol, 3-methyl-1,5-pentanediol, 1,9-nonanediol, 2-ethyl-2-butyl-1,3-propanediol, trimethylolpropane, diethylene glycol, dipropylene glycol, polypropylene glycol, 1,4-dimethylolcyclohexane, bisphenol-A polyethoxydiol and polytetramethylene glycol; polyesterpolyol obtained by reaction of the above-mentioned polyol with polybasic acid or anhydride thereof such as succinic acid, maleic acid, itaconic acid, adipic acid, hydrogenated dimer acid, phthalic acid, isophthalic acid and terephthalic acid; polycaprolactone polyol obtained by reaction of the above-mentioned polyol with ε-caprolactone; a compound obtained by reaction of the above-mentioned polyol and a reaction product of the above-mentioned polybasic acid or anhydride thereof and ε-caprolactone; polycarbonate polyol; or polymer polyol), and the organic polyisocyanate compound (e.g., tolylene diisocyanate, isophorone diisocyanate, xylylene diisocyanate, diphenylmethane-4,4'-diisocyanate, dicyclopentanyl diisocyanate, hexamethylene diisocyanate, 2,4,4'-trimethylhexamethylene diisocyanate, 2,2',4-trimethylhexamethylene diisocyanate), and the hydroxyl-containing (meth)acrylate (e.g., 2-hydroxyethyl (meth)acrylate, 2-hydroxyropyl(meth)acrylate, 4-hydroxybutyl (meth)acrylate, 2-hydroxy-3-phenyloxypropyl (meth)acrylate, cyclohexane-1,4-dimethylolmono(meth)acrylate, pentaerythritol tri(meth)acrylate or glycerol di(meth)acrylate);

bisphenol-type epoxy(meth)acrylate obtained by reaction of bisphenol-A epoxy resin or bisphenol-F epoxy resin and (meth)acrylic acid.

The photo-curable resin can be employed singly or in combination of two or more kinds. Especially, combination of urethane acrylate and acrylate monomer is preferred. The photo-curable resin can be used together with thermo polymerization initiator, i.e., these can be employed as a thermosetting resin.

Photopolymerization initiators can be optionally selected depending upon the properties of the photo-curable resin used. Examples of the photopolymerization initiators include acetophenone type initiators such as 2-hidroxy-2-methyl-1-phenylpropane-1-on, 1-hydroxycyclohexylphenylketone and 2-methyl-1-[4-(methylthio)phenyl]-2-morphorino-propane-1-on; benzoin type initiators such as benzylmethylketal; benzophenone type initiators such as benzophenone, 4-phenylbenzophenone and hydroxybenzophenone; thioxanthone type initiators such as isopropylthioxanthone and 2,4-diethylthioxanthone. Further, as special type, there can be mentioned methylphenylglyoxylate. Especially preferred are 2-hidroxy-2-methyl-1-phenylpropane-1-on, 1-hydroxycyclohexylphenylketone, 2-methyl-1-[4-(methylthio)phenyl]-2-morphorinopropane-1-on and benzophenone. These photopolymerization initiators can be employed together with one or more kinds of a conventional photopolymerization promoter such as a benzoic acid type compound (e.g., 4-dimethylaminobezoic acid) or a tertiary amine compound by mixing with the promoter in optional ratio. Only the initiator can be employed singly or in combination of two or more kinds. Especially, 1-hydroxycyclohexylphenylketone (Irgercure 184, available from Chiba-Specialty Chemicals) is preferred. The initiator is preferably contained in the photo-curable resin in the range of 0.1 to 10% by weight, particularly 0.1 to 5% by weight.

The undercoat layer of the invention contains a compound having an amino group (primary, secondary or tertiary amino group) and/or a phosphoric acid group. Preferred examples of the compounds having amino group include compounds derived from at least one selected from dialkylaminoalkyl (meth)acrylates such as dimethylaminoethyl methacrylate and diethylaminoethyl methacrylate, and amino group-containing silane coupling agents such as N-β(aminoethyl)-γ-aminopropylmethyldimethoxysilane, N-β(aminoethyl)-γ-aminopropylmethyltrimethoxysilane, N-β(aminoethyl)-γ- aminopropylmethyltriethoxysilane, γ-aminopropyltrimethoxysilane, γ-aminopropyltriethoxysilane, N-phenyl-γ-aminopropyltrimethoxysilane. Preferred examples of the compounds having phosphoric acid group include compounds derived from at least one selected from 2-methacryloyloxyethyl phosphate and diphenyl-2-methacryloyloxyethyl phosphate. Especially preferred are compounds derived from at least one selected from of dimethylaminoethyl methacrylate (Acryl ester DM, available from Mitsubishi Rayon Co., Ltd.), and γ-aminopropyltrimethoxysilane (KBE903, available from Shin-Etsu Chemical Co., Ltd.), and 2-methacryloyloxyethyl phosphate (P1M, available from Kyoei Chemical Co., Ltd.).

A thickness of the undercoat layer preferably is in the range of 0.01 to 100 μm, especially 0.1 to 10 μm, in order to ensure the excellent transparency of the layer and the enhanced bonding strength between the layer and the transparent conductive layer.

The undercoat layer can be formed by applying a coating liquid of an appropriate composition onto a polymer film with a coater such as bar coater, and curing the coated layer by ultraviolet irradiation or heating.

The polymer film 2, 2a, 2b can be subjected to an appropriate treatment such as a plasma treatment, corona treatment or solvent-washing treatment according to a conventional method, before the undercoat layer 3, 3a, 3b is formed on the polymer film 2, 2a, 2b, in order to enhance the bonding strength of the thin layer to be formed.

Further, a surface of the hardcoat layer 1a can be processed by an antiglare processing, or an AR treatment. Furthermore, an antireflection layer mentioned later can be provided on the hardcoat layer.

As described previously, the first invention can adopt the embodiments of the second to sixth inventions mentioned later.

Subsequently, the embodiments of the second invention are explained in detail by referring FIG. 3 to FIG. 5.

Figure 3:
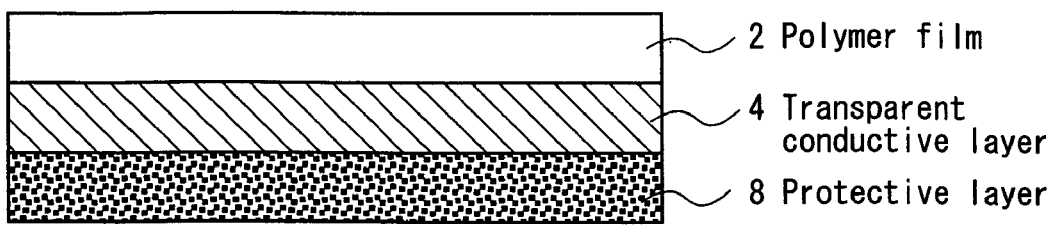
FIG. 3 is a section view showing an example of the transparent conductive film of the second invention according to the present invention.

FIG. 3 is a section view showing an example of the transparent conductive film of the second invention according to the present invention. In the transparent conductive film of the invention, a transparent conductive layer 4 and a protective layer 8 comprising a polymeric compound are superposed in this order on one side of a polymer film 2. Provision of the protective layer 8 of the invention comprising a polymeric compound leads to interruption of the interaction between the transparent conductive layer and an opposite another transparent conductive layer, the interaction being derived from the affinities of the layers to be faced to each other. Thus, the transparent conductive film free from its falling or peeling and hence showing excellent durability can be obtained.

Figure 4:
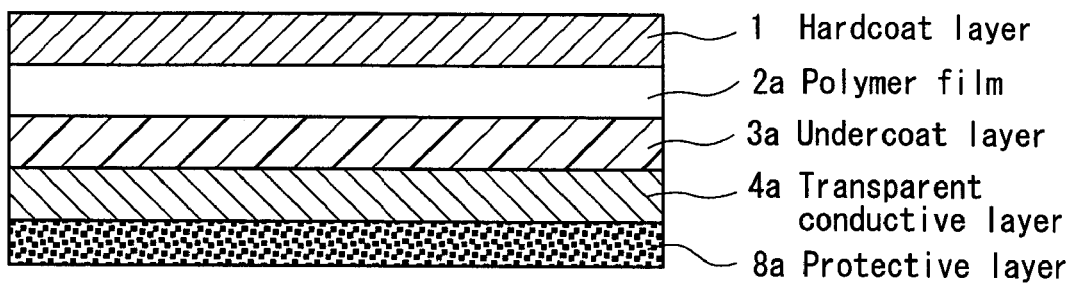
FIG. 4 is a section view showing an example of the upper electrode of touch panel having the transparent conductive film of the second invention.

FIG. 4 is a section view showing an example of the upper electrode of touch panel having the transparent conductive film of the second invention. In FIG. 4, a hardcoat layer 1a is provided on one side of a polymer film 2a, and an undercoat layer 3a, a transparent conductive layer 4a and a protective layer 8 comprising a polymeric compound are superposed in this order on the other side of the polymer film 2a.

Figure 5:
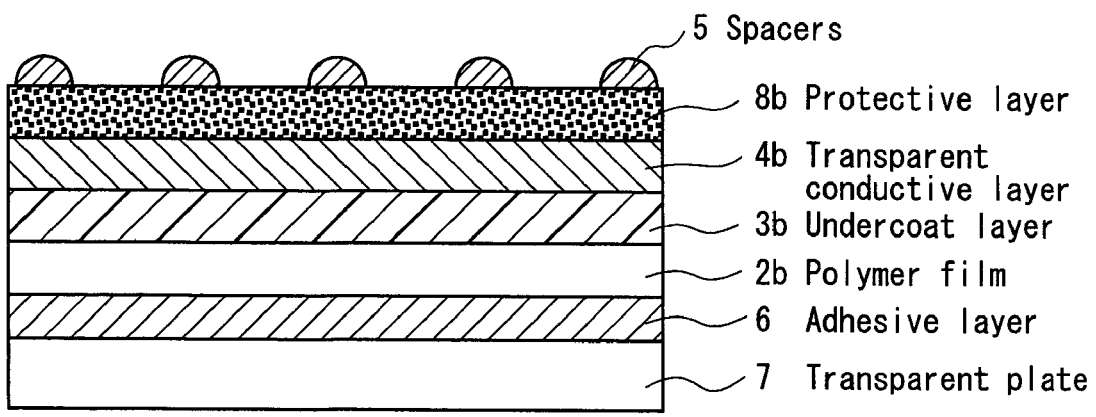
FIG. 5 is a section view showing an example of the lower electrode of touch panel having the transparent conductive film of the second invention.

FIG. 5 is a section view showing an example of the lower electrode of touch panel having the transparent conductive film of the second invention. In FIG. 5, an undercoat layer 3b, a transparent conductive layer 4b and a protective layer 8 comprising a polymeric compound are superposed in this order on one side of the polymer film 2a, and further spacers 5 are provided on the protective layer 8. A transparent plate 7 made of plastic material (e.g., acrylic resin or polycarbonate) is bonded to the other side of the polymer film 2b through an adhesive layer 6.

The material and thickness of the polymer film 2, 2a, 2b follow the description in the first invention. The material and thickness of the transparent conductive layer 4, 4a, 4b also follow the description in the first invention.

The protective layer 8 comprising a polymeric compound, which constitutes a feature of the second invention, generally comprises one or more resin selected from acrylic resin, polyester resin, epoxy resin, urethane resin, phenol resin, maleic acid resin, melamine resin, urea resin, polyimide resin and silicon-containing resin. There can be mentioned, for example, acrylic resin derived from alkyl(meth)acrylate or (meth)acrylic acid, polyester resin derived from polyhydric alcohol (e.g., ethylene glycol and glycerol) and polybasic acid (e.g., succinic acid and phthalic acid), epoxy resin derived from, for example, epichlorohydrin and polyhydric phenol, urethane resin derived from, for example, 2,4-and 2,6-tolylene diisocyanate and polyoxypropylene glycol, phenol resin derived from, for example, phenol, cresol or xylenol and formaldehyde, maleic acid resin derived from, for example, rosin-maleic anhydride adduct and polyhydric alcohol (e.g., glycerol and pentaerythritol), polyimide resin derived from, for example, pyromellitic anhydride and m-phenylene diamine, and silicon-containing resin derived from amino group-containing alkoxysilane.

The protective layer is preferably formed from a composition comprising the silicon-containing compound. The silicon-containing resin is generally derived from amino group-containing alkoxysilane such as aminotrimethoxysilane, N-β (aminoethyl)-γ-aminopropyltriimethoxysilane, N-β (aminoethyl)-γ-aminopropylmethyldimethoxysilane, γ-aminopropyltriethoxysilane, N-phenyl-γ-aminopropyltrimethoxysilane. A main component of the composition preferably is a silane compound represented by $H_3N_xSi(OR)_{4-x}$, in which R represents an organic group, preferably methyl or ethyl, and x represents 0, 1, 2 or 3. The composition is crosslinked in three-dimensions by dehydration-condensation of silanol group of the compound to form a layer having high hardness. The crosslinking is generally carried out by heating at 80 to 220° C. for 10 min. to one hour.

The protective layer is preferably formed from UV-curable resin. Examples of the UV-curable resins (or compounds) include (meth)acrylate monomers such as 2-hydroxyethyl (meth)acrylate, 2-hydroxyropyl (meth)acrylate, 4-hydroxybutyl(meth)acrylate, 2-ethylhexylpolyethoxy (meth)acrylate, benzyl(meth)acrylate, isobornyl(meth)acrylate, phenyloxyethyl (meth)acrylate, tricyclodecane mono(meth) acrylate, dicyclopentenyloxyethyl (meth)acrylate, tetrahydrofurfuryl(meth)acrylate, acryloylmorpholine, N-vinylcaprolactam, 2-hydroxy-3-phenyloxypropyl (meth)acrylate, o-phenylphenyloxyethyl(meth)acrylate, neopentylglycol di(meth)acrylate, neopentyl glycol dipropoxy di(meth)acrylate, neopentyl glycol hydroxypivalate di(meth)acrylate, tricyclodecanedimethylol di(meth)acrylate, 1,6-hexanediol di(meth)acrylate, nonanediol di(meth)acrylate, trimethylolpropane tri(meth)acrylate, pentaerythritol tri(meth)acrylate, pentaerythritol tetra(meth)acrylate, tris[(meth)acryloxyethyl]isocyanurate and ditrimethylolpropane tetra(meth) acrylate; and the following (meth)acrylate oligomer such as:

polyurethane (meth)acrylate such as compounds obtained by reaction among the following polyol compound and the following organic polyisocyanate compound and the following hydroxyl-containing (meth)acrylate:

the polyol compound (e.g., polyol such as ethylene glycol, propylene glycol, neopentyl glycol, 1,6-hexanediol, 3-methyl-1,5-pentanediol, 1,9-nonanediol, 2-ethyl-2-butyl-1,3-propanediol, trimethylolpropane, diethylene glycol, dipropylene glycol, polypropylene glycol, 1,4-dimethylolcyclohexane, bisphenol-A polyethoxydiol and polytetramethylene glycol; polyesterpolyol obtained by reaction of the above-mentioned polyol with polybasic acid or anhydride thereof such as succinic acid, maleic acid, itaconic acid, adipic acid, hydrogenated dimer acid, phthalic acid, isophthalic acid and terephthalic acid; polycaprolactone polyol obtained by reaction of the above-mentioned polyol with ε-caprolactone; a compound obtained by reaction of the above-mentioned polyol and a reaction product of the above-mentioned polybasic acid or anhydride thereof and ε-caprolactone; polycarbonate polyol; or polymer polyol), and the organic polyisocyanate compound (e.g., tolylene diisocyanate, isophorone diisocyanate, xylylene diisocyanate, diphenylmethane-4,4'-diisocyanate, dicyclopentanyl diisocyanate, hexamethylene diisocyanate, 2,4,4'-trimethylhexamethylene diisocyanate, 2,2',4-trimethylhexamethylene diisocyanate), and the hydroxyl-containing (meth)acrylate (e.g., 2-hydroxyethyl (meth)acrylate, 2-hydroxyropyl(meth)acrylate, 4-hydroxybutyl (meth)acrylate, 2-hydroxy-3-phenyloxypropyl(meth)acrylate, cyclohexane-1,4-dimethylolmono(meth)acrylate, pentaerythritol tri(meth)acrylate or glycerol di(meth)acrylate);

bisphenol-type epoxy(meth)acrylate obtained by reaction of bisphenol-A epoxy resin or bisphenol-F epoxy resin and (meth)acrylic acid.

The UV-curable resin can be employed singly or in combination of two or more kinds. Combination of urethane acrylate and acrylate monomer, especially combination of urethane acrylate with neopentylglycol diacrylate is preferred. The UV-curable resin can be used together with thermo polymerization initiator, i.e., these can be employed as a thermosetting resin.

In case the protective layer comprising polymeric compound is formed using the UV-curable resin, photopolymerization initiators are used to cure the resin. Examples of the photopolymerization initiators include acetophenone type initiators such as 2-hidroxy-2-methyl-1-phenylpropane-1-on, 1-hydroxycyclohexylphenylketone and 2-methyl-1-[4-(methylthio)phenyl]-2-morphorino-propane-1-on; benzoin type initiators such as benzylmethylketal; benzophenone type initiators such as benzophenone, 4-phenylbenzophenone and hydroxybenzophenone; thioxanthone type initiators such as isopropylthioxanthone and 2,4-diethythioxanthone. Further, as special type, there can be mentioned methylphenylglyoxylate. Especially preferred are 2-hidroxy-2-methyl-1-phenylpropane-1-on, 1-hydroxycyclohexylphenylketone, 2-methyl-1-[4-(methylthio)phenyl]-2-morphorinopropane-1-on and benzophenone. These photopolymerization initiators can be employed together with one or more kinds of a conventional photopolymerization promoter such as a benzoic acid type compound (e.g., 4-dimethylaminobezoic acid) or a tertiary amine compound by mixing with the promoter in optional ratio. Only the initiator can be employed singly or in combination of two or more kinds. Especially, 1-hydroxycyclohexylphenylketone (Irgercure 184, available from Chiba-Specialty Chemicals) is preferred. The initiator is preferably contained in the photo-curable resin in the range of 0.1 to 10 weight %, particularly 0.1 to 5 weight %.

Thickness of the protect layer 8, 8a, 8b is appropriately set depending upon the used materials, and the light transmission and durability required for the transparent conductive film. When the thickness is excessively reduced, the protective layer does not sufficiently serve to protect the transparent conductive layer. In contrast, when the thickness is excessively increased, the protective layer is apt to reduce the transparency of the transparent conductive film or the electrically conductive properties of the transparent conductive layer, and also the transparent conductive film is so thick per se. Thus the thickness of the protective layer preferably is in the range of 1 to 1,000 nm, especially 1 to 100 nm.

The protective layer comprising polymeric compound of the invention can be provided on the transparent conductive layer of the upper or lower electrode. Provision of the protective layer on only one side of upper and lower electrodes brings about interruption of the affinity interaction between the transparent conductive layers having the same or similar properties each other, whereby the transparent conductive film can be enhanced in durability.

The protective layer can be formed by applying a coating liquid of an appropriate composition onto a polymer film with a coater such as a doctor knife coater, bar coater, gravure roll coater, curtain coater or knife coater, and curing the coated layer by ultraviolet irradiation or heating.

In the transparent conductive film, a hardcoat layer 1 can be formed on one side of the polymer film 2a where the transparent conductive layer 4a is not formed in order to protect the polymer film from damage caused by the pushing of a pen or fingertip. Further, an antireflection layer mentioned later can be provided on the hardcoat layer.

Though the transparent conductive layer may be directly formed on the polymer film, the undercoat layer 3a, 3b is generally provided between the polymer film 2a, 2b and the transparent conductive layer 4a, 4b to enhance bonding strength between polymer film 2a, 2b and the transparent conductive layer 4a, 4b preventing falling or peeling of the transparent conductive layer.

Materials for forming the undercoat layer 3a, 3b include acrylic resin, urethane resin, epoxy resin, and products obtained by hydrolysis of organic silicon compound.

The undercoat layer can be formed by applying a coating liquid of an appropriate composition onto a polymer film with a coater such as bar coater.

The treatment of the polymer film and the processing of the hardcoat layer can be carried out in the same manner as in the first invention.

As the spacers, those described in the first invention can be used.

The transparent conductive can be used in the same industrial field as in the first invention.

Subsequently, the embodiments of the third invention are explained in detail by referring FIG. 6 and FIG. 7.

Figure 6:
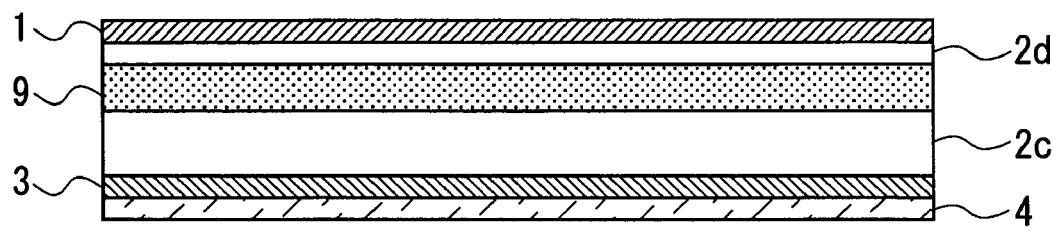
FIG. 6 is a section view showing an example of the transparent conductive film of the third invention according to the present invention.

FIG. 6 is a section view showing an example of the transparent conductive film of the third invention according to the present invention. In FIG. 6, a hardcoat layer 1 is provided on one side of a polymer film (second polymer film) 2d, and a transparent conductive layer 4 is provided on a polymer film (first polymer film) 2c through an undercoat layer 3a, and the two polymer films are bonded to each other through an adhesive layer 9 such that the reverse sides (sides having no layer) of the films face each other. The adhesive layer 9 of the invention comprises polyolefin resin and has high elastic modulus and high bonding strength to the polymer films on the both sides of the adhesive layer 9. Therefore, when signals are repeatedly input onto the touch panel having the transparent conductive layer of the invention as the upper electrode, the provision of an adhesive layer relaxes load received by the input and the high bonding strength effectively of the adhesive layer prevents the peeling of the polymer film, whereby excellent durability can be obtained. In more detail, the provision of an adhesive layer effectively prevents the crack, falling and peeling of the polymer film caused when signals are repeatedly input onto the touch panel by pushing it with a pen or fingertip. Especially the adhesive layer comprising crosslinked polyolefin can extremely enhance the bonding strength. The protective layer can be provided on the transparent conductive layer.

Figure 7:
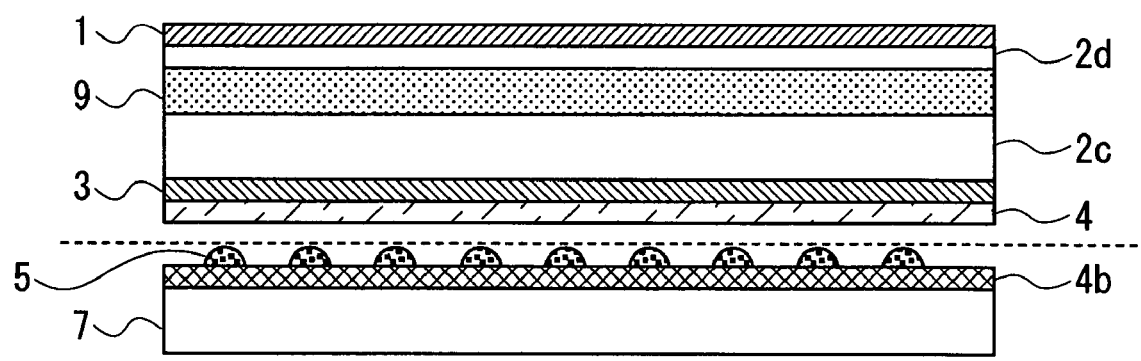
FIG. 7 is a section view showing an example of the touch panel in which the transparent conductive film the third invention is used in the upper electrode.

FIG. 7 is a section view showing an example of the touch panel in which the transparent conductive film of the third invention is used in the upper electrode. In the touch panel of FIG. 7, the transparent conductive film shown in FIG. 6 is used as an upper electrode, and a composite having the transparent conductive layer 4b and microdot spacers 5 superposed in this order on a transparent plate 7 is used as a lower electrode. The touch panel is assembled by bonding the upper and lower electrodes such that both of the transparent conductive layers face each other. As is apparent from FIG. 7, the adhesive layer 9 comprising polyolefin of the invention relaxes the load given from outside to extremely reduce the load applied to the transparent conductive layer.

The materials of the first and second polymer films 2c, 2d follow the description in the first invention.

A thickness of the first and second polymer films, though depending upon the use of the transparent conductive film, is generally in the range of 13 μm to 0.5 mm in the case of using as the upper electrode of touch panel. When the film has the thickness of less than 13 μm, the upper electrode having the film does not have sufficient durability. When the film has the thickness of more than 0.5 mm, the resultant touch panel has increased thickness to injure the flexibility. The thickness of the second polymer film is preferably set to be thinner than that of the first polymer film, especially in the range of 13 μm to 0.2 mm.

The material and thickness of the transparent conductive layer 4, 4b follow the description in the first invention.

The transparent conductive layer can be formed according to a conventional process, preferably by a sputtering process.

In the third invention, the reverse side of the first polymer film having transparent conductive layer is bonded to the reverse side of the second polymer film through the adhesive layer of the invention.

Examples of materials for forming the adhesive layer include polyolefin resin such as polyethylene, polypropylene, and copolymer of ethylene and other monomer (e.g., vinyl acetate, acrylate, methacrylate, maleic anhydride, maleic acid). Preferred examples of the polyolefin resin include (I) ethylene/vinyl acetate copolymer having the vinyl acetate content of 20 to 80 weight %, (II) ethylene/vinyl acetate copolymer having the vinyl acetate content of 20 to 80 weight % and acrylate and/or methacrylate monomer content of 0.01 to 10 weight %, and (III) ethylene/vinyl acetate copolymer having the content of vinyl acetate of 20 to 80 weight % and the content of maleic anhydride and/or maleic acid of 0.01 to 10 weight %. These copolymers (I) to (III) preferably has Melt flow Rate (MRF) of 1 to 3,000, further 1 to 1,000, especially 1 to 800.

In these copolymers (I) to (III), the vinyl acetate content is preferably 20 to 80 weight % as above, especially 20 to 60 weight %. When the content is less than 20 weight %, the crosslinked density obtained by crosslinking (curing) the copolymer under heating is insufficient. When the content is more than 80 weight %, the copolymers (I) and (II) show reduced softening temperature whereby the storage comes to difficult to give practical problem while the copolymer (III) shows extremely reduced bonding strength and poor durability.

Further, in the copolymer (II) comprising ethylene, vinyl acetate and acrylate and/or methacrylate monomer, the acrylate and/or methacrylate monomer content is preferably 0.01 to 10 weight % as above, especially 0.05 to 5 weight %. When the acrylate and/or methacrylate monomer content is less than 0.01 weight %, the copolymer (II) does not show sufficiently increased bonding strength, whereas the content more than 10 weight % is apt to reduce the processing properties.

The acrylate and/or methacrylate monomer is generally esters of acrylic or methacrylic acid and aliphatic alcohol of 1 to 20 carbon atoms, especially 1 to 18 carbon atoms, in which the alcohol may have a substituent (e.g., epoxy group), for example, methyl acrylate, methyl methacrylate, ethyl acrylate, ethyl methacrylate and glycidyl methacrylate.

Further, in the copolymer (III) comprising ethylene, vinyl acetate and maleic anhydride and/or maleic acid, the content of maleic anhydride and/or maleic acid is preferably 0.01 to 10 weight % as above, especially 0.05 to 5 weight %. When the content of maleic anhydride and/or maleic acid is less than 0.01 weight %, the copolymer (III) does not show sufficiently increased bonding strength, whereas the content more than 10 weight % is apt to reduce the processing properties.

The polymer constituting the adhesive layer generally contains the ethylene/vinyl acetate copolymer (I) to (III) in an amount of not less than 40 weight %, preferably not less than 60 weight %, especially 100 weight % based on the total amount of the layer. In case of using polymer other than the above copolymer (I) to (III), for example, olefin polymer having 20 or more weight % of ethylene and/or propylene in the main chain, poly vinyl chloride, and acetal resin.

As a crosslinking agent for thermo polymerizing and crosslinking polyolefin such as ethylene/vinyl acetate copolymer, an organic peroxide is generally employed.

As the organic peroxide, any materials that can be decomposed at a temperature of not less than 70° C. to generate radical(s) can be employed. The organic peroxide is selected in the consideration of film-forming temperature, condition for preparing the polymer composition, curing (bonding) temperature, heat resistance of body to be bonded, storage stability. Especially, preferred are those having a decomposition temperature of not less than 50° C. in a half-life of 10 hours.

Examples of the organic peroxide include 2,5-dimethylhexane-2,5-dihydroperoxide, 2,5-dimethyl-2,5-(t-butylperoxy)hexyne-3-di-t-butylperoxide, t-butylcumyl peroxide, 2,5-dimethyl-2,5-di(t-butylperoxy)hexane, dicumyl peroxide, α,α'-bis(t-butylperoxyisopropyl)benzene, n-butyl-4,4-bis(t-butylperoxy)valerate, 2,2-bis(t-butylperoxy)butane, 1,1-bis(t-butylperoxy)cyclohexane, 1,1-bis(t-butylperoxy)-3,3,5-trimethylcyclohexane, t-butylperoxybenzoate, benzoyl peroxide, t-butylperoxyacetate, methyl ethyl ketone peroxide, 2,5-dimethylhexyl-2,5-bisperoxybenzoate, butyl hydroperoxide, p-menthane hydroperoxide, p-chlorobenzoyl peroxide, hydroxyheptyl peroxide, chlorohexanone peroxide, octanoyl peroxide, decanoyl peroxide, lauroyl peroxide, cumyl peroxyoctoate, succinic acid peroxide, acetyl peroxide, t-butylperoxy(2-ethylhexanoate), m-toluoyl peroxide, t-butylperoxyisobutylate and 2,4-dichlorobenzoyl peroxide. The organic peroxide can be used singly, or in combination of two or more kinds. The content of the organic peroxide is preferably in an amount of 0.1 to 10 weight % based on the polyolefin resin such as ethylene/vinyl acetate copolymer.

In case the polyolefin resin is cured by light, photosensitizer (photopolymerization initiator) is used instead of the organic peroxide, and it is generally used in an amount of 0.1 to 10.0 weight % based on the polyolefin resin.

Examples of the photopolymerization initiator include hydrogen drawing type initiators such as benzophenone, methyl o-benzoyl benzoate, 4-benzoyl-4'-methyldiphenylsulphide, isopropylthioxanthone, diethylthioxanthone, and methyl 4-(diethylamino)benzoate; intermolecular cleavage type initiators such as benzoin ether, benzoin isopropyl ether, benzoin dimethyl ketal; α-hydroxyalkylphenone type initiators such as 2-hydroxy-2-methyl-1-phenylpropane-1-on, 1-hydroxycyclohexyl phenyl ketone, alkylphenyl glyoxylate, diethoxyacetophenone; α-aminoalkylphenon type initiators such as 2-methyl-1-[4-(methylthio)phenyl]-2-morphorino-propanon-1 and 2-bemzyl-2-dimethylamino-1-(4-mor-phorinophenyl)butanone-1; and acylphosphinoxide. The photopolymerization initiators can be used singly, or in combination of two or more kinds.

The adhesive layer of the invention preferably contains a silane coupling agent. Examples of the silane coupling agent include vinylethoxysilane, vinyltris(β-methoxyethoxy)silane, γ-(methacryloxypropyl)trimethoxysilane, vinyltriacetoxysilane, γ-glycidoxypropyltrimethoxysilane, γ-glycidoxypropyltriethoxysilane, β-(3,4-epoxycyclohexyl) ethyltrimethoxysilane, vinyltrichlorosilane, γ-mercaptopropylmethoxysilane, γ-aminopropyltriethoxysilane, N-β(aminoethyl)-γ-aminopropyltrimethoxysilane. Preferred is γ-(methacryloxypropyl)trimethoxysilane. The silane coupling agent can be used singly, or in combination of two or more kinds. The content of the silane coupling agent is preferably in an amount of 0.01 to 10 weight % based on the polyolefin resin.

Further, the adhesive layer can contain an epoxy group-containing compound as an adhesion-promoting agent. Examples of the epoxy group-containing compound include triglycidyl tris(2-hydroxyethyl)isocyanurate, neopentylglycol diglycidyl ether, 1,6-hexanediol diglycidyl ether, allyl glycidyl ether, 2-ethylhexyl glycidyl ether, phenyl glycidyl ether, phenol(ethyleneoxy)$_5$glycidyl ether, p-tert-butylphenyl glycidyl ether, diglycidyl adipate, diglycidyl phthalate, glycidyl methacrylate and butyl glycidyl ether. The agent can be used singly, or in combination of two or more kinds. The content of the agent is preferably in an amount of 0.1 to 20 weight % based on the polyolefin resin.

The adhesive layer preferably contains acryloxy group-containing compounds, methacryloxy group-containing compounds and/or epoxy group-containing compounds for improvement or adjustment of various properties of layer (e.g., mechanical strength, adhesive property (bonding strength), optical characteristics such as transparency, heat resistance, light resistance, crosslinking rate), particularly for improvement mechanical strength.

Examples of the acryloxy and methacryloxy group containing compounds include generally derivatives of acrylic acid or methacrylic acid, such as esters and amides of acrylic acid or methacrylic acid. Examples of the ester residue include linear alkyl groups (e.g., methyl, ethyl, dodecyl, stearyl and lauryl), a cyclohexyl group, a tetrahydrofurfuryl group, an aminoethyl group, a 2-hydroxyethyl group, a 3-hydroxypropyl group, 3-chloro-2-hydroxypropyl group. Further, the esters include esters of acrylic acid or methacrylic acid with polyhydric alcohol such as ethylene glycol, triethylene glycol, polypropylene glycol, polyethylene glycol, trimethylol propane or pentaerythritol.

Example of the amide includes diacetone acrylamide.

Examples of polyfunctional compounds (crosslinking auxiliaries) include esters of plural acrylic acids or methacrylic acids with polyhydric alcohol such as glycerol, trimethylol propane or pentaerythritol; and further triallyl cyanurate, triallyl isocyanurate, diallyl phthalate, diallyl isophthalate and diallyl maleate.

The above compound containing acryloxy and the like can be used singly, or in combination of two or more kinds. The content of the compound is preferably in an amount of 0.1 to 50 weight %, especially 0.5 to 30 weight % based on the polyolefin resin. When the compound is used in an amount of more than 50 weight %, there are some cases where the preparation of a coating liquid for forming the adhesive layer comes to difficult or the coating properties of the liquid becomes poor. The addition of the compound of less than 0.1 weight % does not bring about effect by the addition.

Further the adhesive layer can contain a hydrocarbon resin for improving processing properties such as laminating properties. The hydrocarbon resin may be either natural resin or synthetic resin. Examples of the natural resins preferably include rosins, rosin derivatives and terpene resins. Examples of the rosins include gum resins, tall oil resins, wood resins. Examples of the rosin derivatives include hydrogenated rosins, disproportionated rosins, polymerized rosins, esterificated rosins, and metal salts of rosins. Examples of the terpene resins include α-pinene resins, β-pinene resins, and terpene phenol resins. Moreover, as the natural resin, dammar, copal, shellac can be used. Examples of the synthetic resins preferably include petroleum resins, phenol resins, and xylene resins. Examples of the petroleum resins include aliphatic petroleum resins, aromatic petroleum resins, cycoaliphatic petroleum resins, copolymer type petroleum resins, hydrogenated petroleum resins, pure monomer type petroleum resins, and coumarone-indene resins. Examples of the phenol resins include alkylphenol resins and modified phenol resins. Examples of the xylene resins include xylene resins and modified xylene resins. The content of the hydrocarbon resin, which can be appropriately selected, is preferably in an amount of 1 to 200 weight %, especially 5 to 150 weight % based on the polyolefin resin.

The adhesive layer of the invention is generally prepared, for example, by homogeneously mixing the composition composed of the above-mentioned materials in an appropriate proportion, kneading the mixture using an extruder or roll, and subjecting the kneaded mixture to a film-forming process using a calendar, roll, T-die extrusion or inflation to form a film having a predetermined dimension. A more preferred process for forming the adhesive layer comprises the steps of: mixing and dissolving homogeneously the components in a good solvent, applying the resultant solution onto a separator coated closely with silicone or fluoric resin (or onto a support) by means of flow-coater process, roll-coater process, gravure-roll process, mayer-bar process or lip-die coating process, and vaporizing the solvent. Then, the resultant layer is peeled from the support to obtain the adhesive layer (uncrosslinked).

The transparent conductive film can be obtained by bonding the second polymer film having the hardcoat layer formed thereon to the first polymer film having the transparent conductive layer formed thereon using the above crosslinkable adhesive layer. The bonding (laminating) may be carried out using calendar process, roll process, T-die extrusion process or inflation process at the same time with the formation of the adhesive layer. Otherwise, these layers and films can be also bonded to each other by depressing them under heating using a roll or the like. After the bonding, the resultant laminated film is preferably subjected to a degassing treatment by pressurizing and heating and/or a degassing treatment by vacuum heating to remove gas in the adhesive layer. The degassing treatment by pressurizing is carried out by placing the laminated film in a pressurizing and heating chamber such as an autoclave to remove the gas (degas). In case a crosslinkable adhesive is used as an adhesive, it is crosslinked after the degassing.

When the crosslinking is performed by heating, the temperature for the heating, depending on kinds of crosslinkers (organic peroxides) generally is in the range of 70 to 150° C., preferably 70 to 130° C., for 10 sec. to 120 min., preferably 20 sec. to 60 min. When the crosslinking is performed by light, light source can adopt a large number of sources emitting light in wavelength of ultraviolet to visible ray, for example, super high-pressure, high-pressure and low-pressure mercury lamps, a chemical lamp, a xenon lamp, a halogen lamp, a mercury halogen lamp, a carbon arc lamp, and an incandescent electric lamp, and laser beam. The irradiation (exposing) time is generally a few seconds to a few minutes, depending upon kinds of the lamp and strength of light. To promote the curing, the laminate may be heated beforehand for 40 to 120° C., and then the heated laminate may be exposed to ultraviolet ray.

The pressure used when the polymer films are bonded to by the adhesive layer can be also set appropriately. The pressure is generally 0 to 50 kg/cm$^2$, preferably 0 to 30 kg/cm$^2$. The thickness of the adhesive layer formed as above is generally in the range of 5 to 100 μm.

The protective layer can be provided on the transparent conductive layer of the invention. The protective layer preferably is a thin layer comprising, for example, $SiC_x$, $SiC_xO_y$, $SiC_xN_y$, $SiC_xO_yN_y$, in which x, y, z are an integer.

The thickness of the protective layer is appropriately set depending upon materials used for forming the layer and light transmission and durability required to the transparent conductive film. When the thickness of the protective layer is excessively reduced, the protective effect by the formation of the layer cannot be sufficiently obtained. The excessively increased thickness brings about the reduction of transparency or conductivity, and further the increased thickness of the transparent conductive film. Thus the thickness of the protective layer is preferably in the range of 1 to 1,000 nm, especially in the range of 1 to 100 nm.

In the transparent conductive film, the hardcoat layer 1 is formed on the reverse side of the second polymer film 2d provided with the adhesive layer 9 as mentioned above to protect the polymer film from the load by input with a pen or fingertip. The hardcoat layer can be formed in the same manner as in the first invention.

Further the transparent conductive layer 2c may be formed directly on the first polymer film 4, or formed through the undercoat layer on the polymer film. The provision of the undercoat layer enhances the bonding strength to the polymer film to prevent the peeling of the transparent conductive layer.

The undercoat layer can be formed by vapor deposition process using the materials used for forming the protective layer. Otherwise, as the undercoat layer, a layer of resin such as acrylic resin, urethane resin or epoxy resin, or a layer of hydrolysis product of an organic silicon compound can be formed by coating. The undercoat coated layer can be formed by applying a coating liquid having a desired composition onto the polymer film using a coater such as bar coater.

The polymer film can be subjected to an appropriate surface treatment in the same manner as in the first invention before the undercoat layer is formed on the polymer film. The hardcoat layer can be subjected to an appropriate surface processing in the same manner as in the first invention.

On the hardcoat layer, an antireflection layer can be formed.

The antireflection layer includes laminates having the following structures:

(a) a laminate of two layers in total composed of a high refractive index-transparent thin layer and a low refractive index-transparent thin layer;

(b) a laminate of four layers in total that two high refractive index-transparent thin layers and two low refractive index-transparent thin layers are alternately provided one by one;

(c) a laminate of three layers in total composed of an intermediate refractive index-transparent thin layer, a low refractive index-transparent thin layer and a high refractive index-transparent thin layer;

(d) a laminate of six layers in total that three high refractive index-transparent thin layers and three low refractive index-transparent thin layers are alternately provided one by one.

Examples of materials of the above high or intermediate refractive index-transparent thin layer include ITO (Indium Tin Oxide), ZnO, Al-doped ZnO, $TiO_2$, $SnO_2$, and ZrO whose films generally have refractive index of 1.8 or more.

Examples of materials of the above low or intermediate refractive index-transparent thin layer include $SiO_2$, $MgF_2$, $Al_2O_3$, acrylic resin, urethane resin, silicone resin and fluorine resin whose films generally have refractive index of 1.6 or less. Otherwise, the thin layer can be obtained by coating of a paint comprising an organic binder and low refractive index-inorganic powders mentioned above.

The thicknesses of the low, intermediate and high refractive index-transparent thin layers are appropriately set depending upon the number of layers superposed and materials used in the layers and the central wavelength so as to lower the reflectivity in a visible ray region by interference of light.

For example, in the case of the four-layered antireflection layer, it is preferred that a first high refractive index-thin layer provided on the transparent plate side has thickness of 5 to 50 nm, a second low refractive index-thin layer has thickness of 5 to 50 nm, a third high refractive index-thin layer has thickness of 50 to 100 nm, and a forth low refractive index-thin layer has thickness of 50 to 150 nm. Further, an anti-contamination layer may be formed on the antireflection layer to improve resistance to contamination. Examples of the anti-contamination layer include a fluoric resin thin layer and a silicone resin thin layer having the thickness of 1 to 1,000 nm.

The antireflection layer can be also used in the first and second invention. The materials of the spacers can use those described in the first invention. The transparent conductive film can be employed in the use of the first invention.

Subsequently, the embodiments of the forth invention are explained in detail by referring FIG. 8 to FIG. 10.

Figure 8:
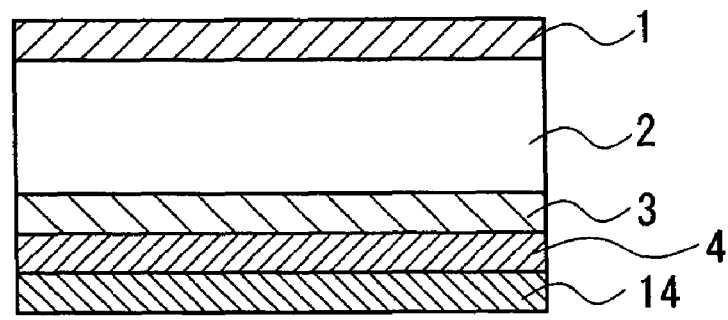
FIG. 8 is a section view showing an example of the transparent conductive film of the forth invention according to the present invention.

FIG. 8 is a section view showing an example of the transparent conductive film of the forth invention according to the present invention. In FIG. 8, a hardcoat layer 1 is provided on one side of a polymer film 2, and an undercoat layer 3 is provided on the other side of the polymer film 2, and further a first transparent conductive layer 4 of a first metal oxide is formed on the undercoat layer 3 and a second transparent conductive layer 14 of a second metal oxide is formed on the first transparent conductive layer 4. The second transparent conductive layer 14 is formed by vapor deposition under the condition different from that of the vapor deposition in the formation of the first transparent conductive layer 4.

The first and second transparent conductive layers have the same components constituting metal oxide as each other but are formed under different conditions from each other. Examples of the metal oxides include indium oxide-tin oxide (ITO), zinc oxide-aluminum oxide (ZAO), and antimony oxide-tin oxide (ATO).

Figure 9:
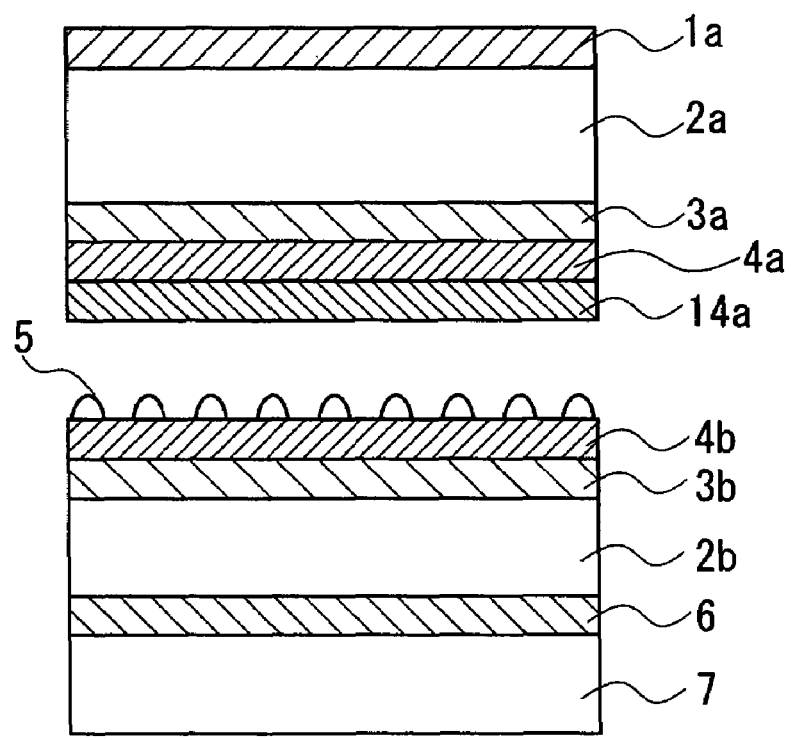
FIG. 9 is a section view showing an example of the touch panel using the transparent conductive film of the forth invention.

FIG. 9 is a section view showing an example of the touch panel having the transparent conductive film of the invention. In the lower electrode, a first transparent conductive layer 4b of a first metal oxide is provided on a polymer film 2b through an undercoat layer 3b, and a transparent plate 7 of a glass or plastic plate is bonded to the other side of the polymer film 2b through an adhesive layer 6. The upper electrode shown in FIG. 8 is bonded to the lower electrode through dot spacers 5 such that the transparent conductive layers of the lower and upper electrodes face each other to provide a touch panel.

Figure 10:
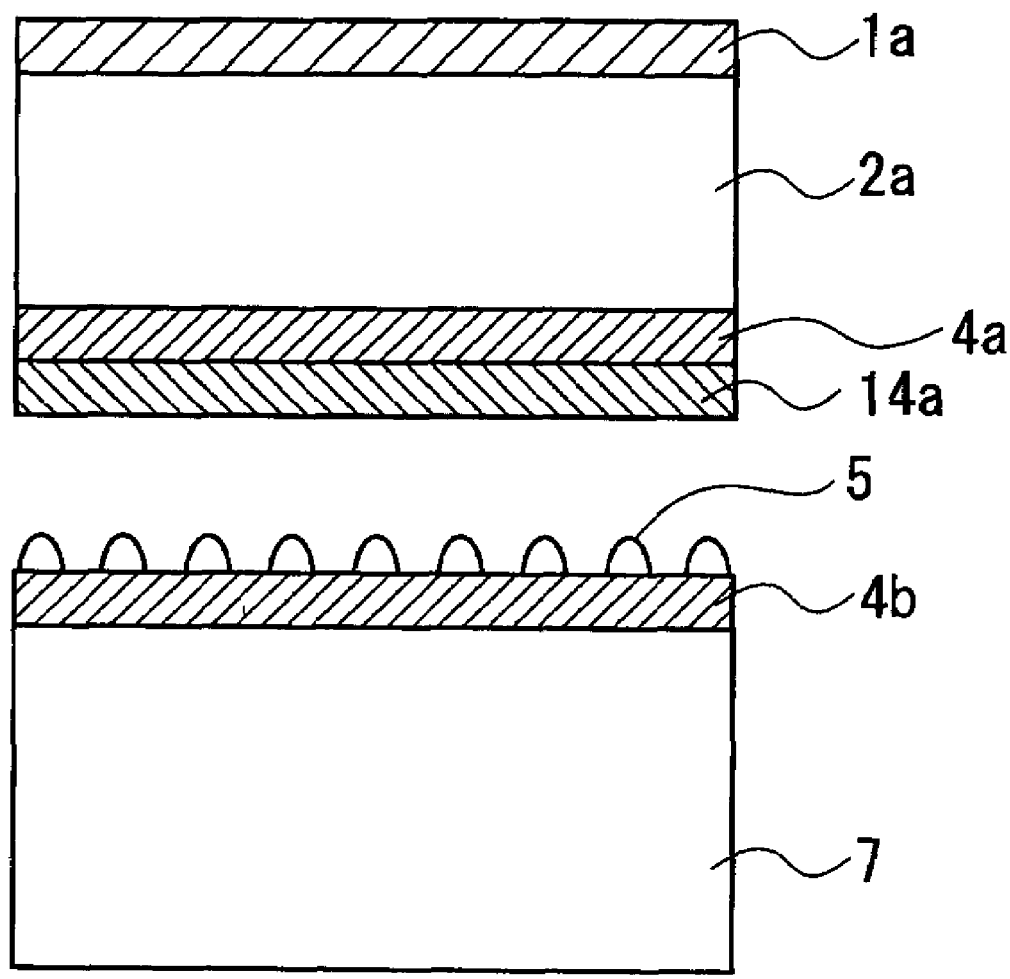
FIG. 10 is a section view showing another example of the touch panel having the transparent conductive film of the forth invention.

FIG. 10 is a section view showing another example of the touch panel having the transparent conductive film of the invention. A lower electrode is prepared by superposing directly the first transparent conductive layer 4b of first metal oxide on a transparent plate 7 of a glass plate, and the lower electrode is bonded to the upper electrode, which comprising a hardcoat layer 1a, a polymer film 2a, first and second transparent conductive layers 4a, 14a, through dot spacers 5 such that the transparent conductive layers of the lower and upper electrodes face each other to provide a touch panel.

A process for preparing the transparent conductive layer using metal oxide is explained by taking an example of ITO film. ZAO and ATO films can be formed in the same manner.

The ITO film is preferably formed by sputtering process. In case a first and second ITO films are formed using sintered material of a mixture of indium oxide-tin oxide as target material, the second transparent conductive layer is formed under different deposition conditions from that for forming the first transparent conductive layer, whereby the first and second transparent conductive layers have different properties from each other.

The oxygen content of the second transparent conductive layer can be enhanced compared with that of first transparent conductive layer by, for example, flowing more amount of oxygen in the sputtering process than in the first transparent conductive layer. Further, the nitrogen content of the second transparent conductive layer can be enhanced by, for example, flowing more amount of nitrogen in the sputtering process than in the first transparent conductive layer. Furthermore, the roughness of surface of the ITO film can be enhanced by increasing the pressure or electric power in the sputtering process, whereby crystallization state or surface shape can be varied between the first and second transparent conductive layers. As mentioned above, in case the first and second transparent conductive layers (ITO films) have different properties from each other, the second ITO film of the upper electrode is scarcely fused to the first ITO film of the lower electrode to prevent the falling or peeling of the transparent conductive layer from the polymer film.

Naturally, the first ITO film may have increased oxygen or nitrogen content or increased roughness compared with the second ITO film. In this case, similarly, the second ITO film of the upper electrode is different in the properties from the first ITO film of the lower electrode, and therefore the two layers are scarcely fused to each other.

When the ITO film is excessively thin, the film does not show sufficient conductivity. When the ITO film is excessively thick, the film show extremely reduced resistivity to bring about a touch panel not having good response. Further this ITO film is costly prepared and has increased thickness. Thus the total thickness of the first and second transparent conductive layers preferably is in the range of 1 to 500 nm, especially 5 to 100 nm.

The ITO film of the lower electrode can be set to be the same properties as the first ITO film of the upper electrode but different in the film properties from the second ITO film of the upper electrode, whereby the fusion between the ITO films can be prevented. Any transparent plate on which an ITO film having the same properties as the first ITO film of the upper electrode is formed can be used as the lower electrode. For example, a glass plate on which an ITO film having the same properties as the first ITO film of the upper electrode is directly formed can be employed.

Although the ITO film is explained above, the first and second transparent conductive layers using ZAO or ATO can be also formed by variation of the conditions of vapor deposition in the same manner as above.

In the invention, the materials and thickness of the polymer film 2, 2a, 2b follow the description in the first invention.

When the polymer film is used in the lower electrode of the touch panel, the thickness of the polymer film may be in the range of 0.5 to 2 mm that is thicker than the above range. However, the same thickness of the polymer film as that of the upper electrode can be also adopted in the case of the combination of the polymer film with the transparent plate such as a plastic plate.

In case the transparent conductive film is used as the upper electrode, a hardcoat layer can be formed on the reverse side having no ITO film of the transparent conductive film to protect the polymer film from the load by input of a pen or fingertip. Examples of the hardcoat layer include an acrylic resin layer, an epoxy resin layer, a urethane resin layer, and a silicone resin layer. The thickness generally is 1 to 50 µm. The hardcoat layer may contain fine particles such as silica particles or alumina particles in the mixed condition. Further antiglare processing, in which scattering materials are kneaded, may be applied to the hardcoat layer.

The antireflection layer can be formed on the hardcoat layer. Examples of the antireflection layer include a laminate composed of a high refractive index-transparent thin layer and a low refractive index-transparent thin layer.

Further, an anti-contamination layer may be formed on the antireflection layer provided on the hardcoat layer to improve resistance to contamination. Examples of the anti-contamination layer include a fluoric resin thin layer and a silicone resin thin layer having the thickness of 1 to 1,000 nm. Further the above antireflection layer may be provided.

The ITO film may be directly formed on the polymer film. However, the undercoat layer is generally provided between the polymer film and the ITO film, whereby the bonding strength between the polymer film and the ITO film can be enhanced to prevent the peeling of the transparent layer.

Examples of materials of the undercoat layer include resins such as acrylic resin, urethane resin, epoxy resin, and hydrolysis product of an organic silicon compound.

The undercoat layer can be formed by applying a coating liquid of an appropriate composition onto a polymer film with a coater such as a doctor knife coater, bar coater, gravure roll coater, curtain coater or knife coater.

The polymer film 2, 2a, 2b can be subjected to an appropriate treatment such as a plasma treatment, corona treatment or solvent-washing treatment according to a conventional method, before the undercoat layer is formed on the polymer film, in order to enhance the bonding strength of the ITO layer to be formed.

Materials of the spacers include thermosetting resin, light-curable resin. The spacers are generally formed by printing the above resin on the transparent conductive layer.

As materials of an adhesive layer for bonding the polymer film to the transparent plate, epoxy resin, combination of phenol or urethane resin with a hardener, or adhesive of acrylic type, rubber type or silicon type is generally used.

Subsequently, the embodiments of the fifth invention are explained in detail by referring FIG. 11 to FIG. 12.

Figure 11:
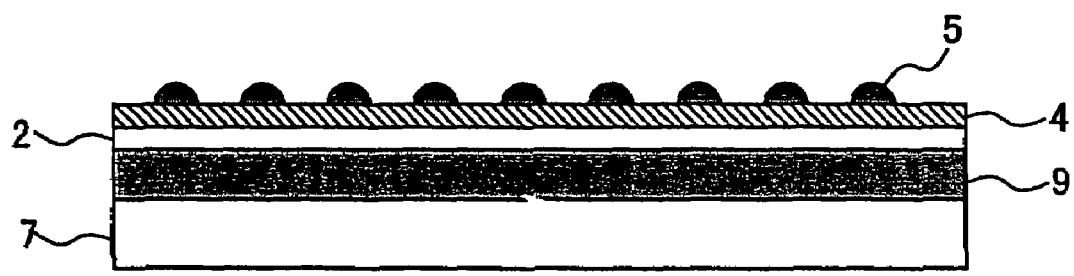
FIG. 11 is a section view showing an example of the transparent conductive plate of the fifth invention according to the present invention.

FIG. 11 is a section view showing an example of the transparent conductive plate of the fifth invention according to the present invention. In the transparent conductive plate, a polymer film 2 provided with a transparent conductive layer 4 through an adhesive layer 9 is provided on a transparent plate 7, and spacers (micro dot spacers) 5 are provided on the transparent conductive layer 4. The spacers are needed when the lower electrode is bonded to an upper electrode to prepare a touch panel. The adhesive layer is a layer comprising polyolefin resin according to the invention. The adhesive layer absorbs force (load) given to the transparent conductive layer to prevent peeling of the transparent conductive layer from the polymer film. Further, though the load generally brings about peeling between the adhesive layer and the polymer film or transparent plate (especially plastic plate), the adhesive layer of the invention is improved in bonding strength not to bring about the peeling. When the polyolefin crosslinked is used, the above effect is greatly enhanced.

Figure 12:
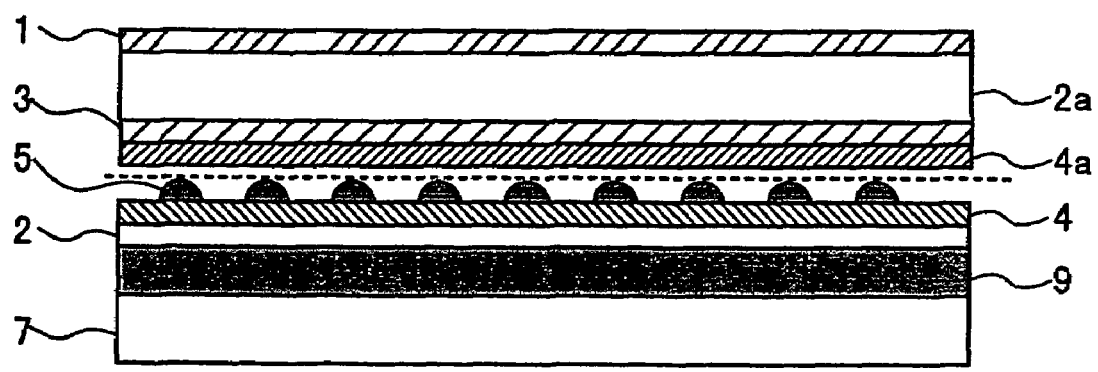
FIG. 12 is a section view showing an example of the touch panel in which the transparent conductive plate the fifth invention is used in the lower electrode.

FIG. 12 is a section view showing an example of the touch panel in which the transparent conductive plate the fifth invention is used in the lower electrode. The transparent conductive plate in shown in FIG. 11 is employed as a lower electrode. An upper electrode is composed of a polymer film 2a, a hardcoat layer 1 provided on one side of the film and a transparent conductive layer 4a provided through an undercoat layer 3 on the other side of the film. The lower and upper electrodes are bonded to each other by the adhesive layer to prepare the touch panel of the invention. The adhesive layer 9 comprising polyolefin resin absorbs force (load) applied from outside to the transparent conductive layer to extremely reduce the load applied to the transparent conductive layer, as shown in FIG. 12. The adhesive layer may be provided between a hardcoat layer (preferably polymer film having hardcoat layer) and the polymer film 2a.

The adhesive layer 9 of the invention comprises polyolefin resin, and has adequate modulus of elasticity and excellent adhesion. In case a touch panel provided with the transparent conductive plate as a lower electrode is repeatedly used, the adhesive layer relaxes the load applied to the transparent conductive layer (transparent electrode) whereby the excellent bonding strength between the layers is maintained and satisfactory durability can be obtained. In more detail, the provision of an adhesive layer enables the prevention of crack, falling and peeling of the transparent conductive layer, which are brought about by repeatedly carrying out input with a pen or fingertip on the surface of the upper electrode. The protective layer may be provided on the surface of the transparent conductive layer.

In the invention, the materials and thickness of the polymer film 2, 2a are as described in the first invention. The materials and thickness of the transparent conductive layer 4, 4a also are as described in the first invention.

The transparent conductive layer can be formed according to the conventional method, but preferably formed by sputtering process.

The transparent plate 7 is generally a plastic or glass plate. Preferred examples of materials of the plastic plate include acrylic resin (especially polymethyl methacrylate), polycarbonate resin, polystyrene resin, polyolefin resin and amorphous polyolefin resin. The thickness is generally in the range of 50 µm to 0.5 mm.

In the invention, the transparent plate 7 is bonded to the reverse side of the polymer film 2 having the transparent conductive layer 4 through the adhesive layer 9. The materials of the adhesive layer 9 are as described in the third invention.

The adhesive layer of the invention is generally prepared in the same manner as in the third invention, for example, by homogeneously mixing a composition composed of the above-mentioned materials in an appropriate proportion, kneading the mixture using an extruder or roll, and subjecting the kneaded mixture to a film-forming process using a calendar, roll, T-die extrusion or inflation to form a film of a predetermined dimension. A more preferred process for forming the adhesive layer comprises the steps of: mixing and dissolving homogeneously the components for forming adhesive layer in a good solvent, applying the resultant solution onto a separator coated closely with silicone or fluoric resin (or onto a support) by means of flow-coater process, roll-coater process, gravure-roll process, mayer-bar process or lip-die coating process, and vaporizing the solvent. Then, the resultant layer is peeled from the support to obtain the adhesive layer (uncrosslinked).

The transparent conductive plate of the invention can be obtained by bonding the plastic plate or glass plate to the polymer film B having the transparent conductive layer using the above (crosslinkable) adhesive layer. The bonding (laminating) may be carried out using calendar process, roll process, T-die extrusion process or inflation process at the same time with the formation of the adhesive layer. Otherwise, these layers, films and plate can be bonded to each other by depressing them under heating using a roll or the like. After the bonding, the resultant laminate is preferably subjected to a degassing treatment by pressurizing and heating and to a degassing treatment by vacuum heating to remove gas in the adhesive layer. The degassing treatment by pressurizing is carried out by placing the laminate in a pressurizing and heating chamber such as an autoclave to remove the gas (degas). In case a crosslinkable adhesive is used as an adhesive, it is crosslinked after the degassing.

Otherwise, the transparent conductive plate preferably is prepared by applying the materials for forming the adhesive layer onto the surface having no transparent conductive layer of the polymer film, introducing the polymer film provided with a layer of the materials (adhesive layer) into a mold for molding such that the transparent conductive layer faces a surface of the mold, and injection molding a resin for forming a transparent plastic plate in the mold provided with the polymer film to incorporate (unite) the polymer film and the resin. It is also possible to carry out crosslinking of the adhesive layer in the forming process.

When the crosslinking is performed by heating, the temperature for the heating, depending on kinds of crosslinkers (organic peroxides) generally is in the range of 70 to 150° C., preferably 70 to 130° C., for 10 sec. to 120 min., preferably 20 sec. to 60 min. When the crosslinking is performed by light after the degassing, light source can be adopted by selecting from a large number of sources emitting light in wavelength of ultraviolet to visible ray, for example, super high-pressure, high-pressure and low-pressure mercury lamps, a chemical lamp, a xenon lamp, a halogen lamp, a mercury halogen lamp, a carbon arc lamp, and an incandescent electric lamp, and laser beam. The irradiation (exposing) time is generally a few seconds to a few minutes, depending upon kinds of the lamp and strength of light. To promote the curing, the laminate may be heated beforehand for 40 to 120° C., and then the heated laminate may be exposed to ultraviolet ray.

Further the pressure applied to the laminate when the bonding is carried out by the adhesive layer is also set appropriately. The pressure is generally in the range of 0 to 50 kg/cm$^2$, preferably 0 to 30 kg/cm$^2$.

The protective layer can be provided on the transparent conductive layer. The protective layer descried previously can be used in this case.

The protective layer can be formed on the transparent conductive layer of the lower or upper electrode. In more detail, provision of protective layer on the transparent conductive layer of only one electrode, i.e., lower or upper electrode, brings about interruption of the affinity interaction between the transparent conductive layers having the same or similar properties each other, whereby the transparent conductive film can be improved in scratching resistance.

The transparent conductive film of the upper electrode described previously can be also used in this case.

Subsequently, the embodiments of the sixth invention are explained in detail by referring FIG. 13 to FIG. 14.

Figure 13:
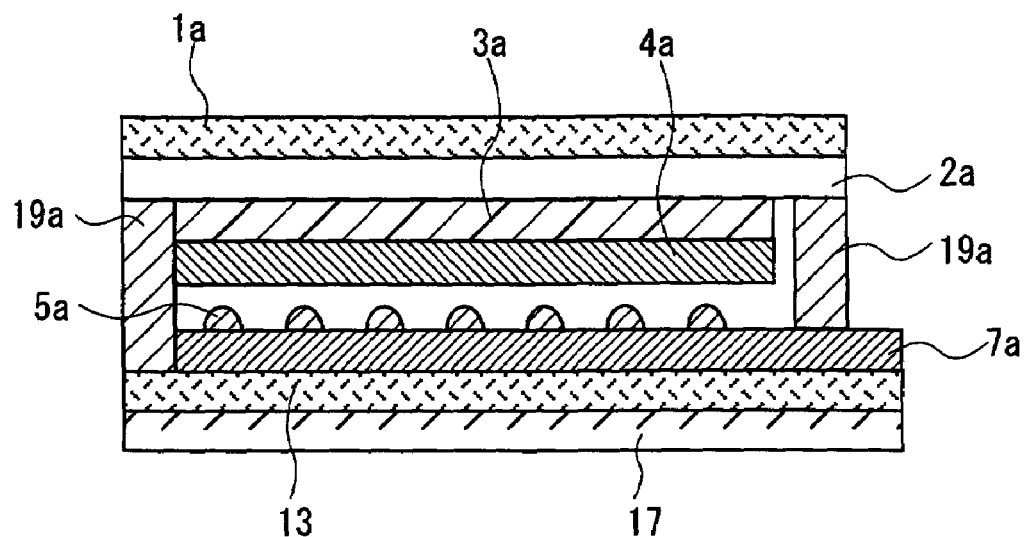
FIG. 13 is a section view showing an example of the touch panel of the sixth invention.

FIG. 13 is a section view showing an example of the touch panel having the transparent conductive film of the sixth invention. The touch panel of the invention is composed of an upper electrode and a lower electrode. In the upper electrode, an undercoat layer 3a and a first transparent conductive layer 4a are superposed in this order on one side of a polymer film 2a whereas a hardcoat layer 1a is provided on the other side of the film 2a. In the lower electrode, a silicon oxide layer 13 and a second transparent conductive layer 7a are superposed in this order on a soda glass plate 17, and spacers 5a are provided on the second transparent conductive layer 7a. These upper and lower electrodes are arranged so as to be faced to each other and bonded to each other on their circumferences using a belt-shaped adhesive layer 19a to prepare a touch panel.

Figure 14:
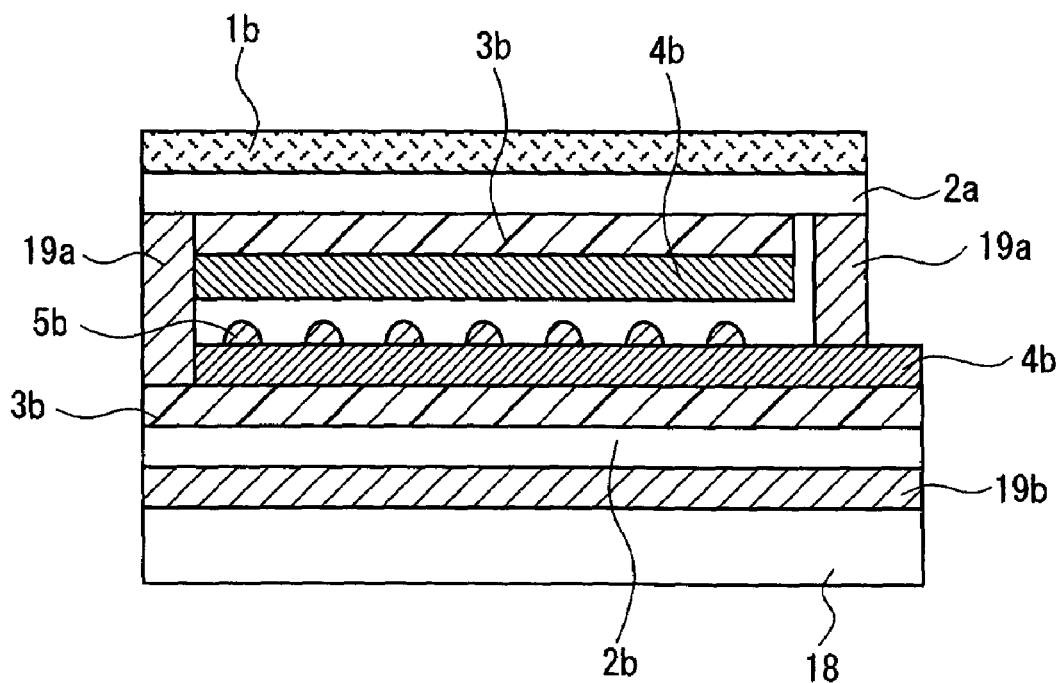
FIG. 14 is a section view showing another example of the touch panel of the sixth invention.

FIG. 14 is a section view showing another example of the touch panel using the transparent conductive film of the invention. The structure of the upper electrode is the same as that of the touch panel shown in FIG. 13. In the lower electrode, a polymer film 2b is bonded to one side of a plastic plate 18 through an adhesive layer 19b, and an undercoat layer 3b and a second transparent conductive layer 4b are provided in this order on other side of the film, and further spacers 5a are formed on the second transparent conductive layer 4b. These upper and lower electrodes are arranged so as to be faced to each other and bonded to each other on their circumferences using a belt-shaped adhesive layer 19a to prepare a touch panel, in the same manner as in FIG. 13.

In the invention, the first and second transparent conductive layers 4a, 4b are formed from materials different from each other. Examples of the materials include metal oxide, combination of the metal oxides, composite film consisting essentially of the metal oxide(s), and further gold, silver, nickel, aluminum, palladium. The materials different from each other mean those different from each other to the extent that is capable of interrupting physical or chemical affinity between the first and second transparent conductive layers. In case one of the first and second transparent conductive layers uses metal oxide, the combination of metal oxides, composite film consisting essentially of the metal oxide(s) or metal material, the other transparent conductive layer uses the metal oxide, combination, composite film or metal material different in at least one metal, the proportion or the film-forming conditions when the composition is the same as each other, from those in the former transparent conductive layer. For example, when one of the first and second transparent conductive layers uses metal oxide (e.g., tin oxide), the other transparent conductive layer uses metal oxide (e.g., indium oxide, zinc oxide, antimony oxide, cadmium oxide), the combination of metal oxides (e.g., ITO, IZO, ATO, GZO), composite film consisting essentially of the metal oxide(s), or metal material (e.g., gold, silver, nickel, aluminum, palladium). Otherwise, when one of the first and second transparent conductive layers uses the combination of metal oxides (e.g., ITO), the other transparent conductive layer uses metal oxide (e.g., indium oxide, zinc oxide, antimony oxide, cadmium oxide), the combination of metal oxides (e.g., IZO, ATO, GZO) different from said combination, the combination of metal oxides that has the same metal oxides as those of said combination but the proportion of metal oxides different from that of said combination, composite film consisting essentially of the metal oxide(s) or metal material (e.g., gold, silver, nickel, aluminum, palladium).

Preferred metal oxides include indium oxide, zinc oxide, tin oxide, antimony oxide and cadmium oxide, and especially tin oxide is preferred from the viewpoint that a layer having high transparency can be easily obtained.

Preferred combinations of metal oxides include sintered material of indium oxide-tin oxide (ITO), sintered material of indium oxide-zinc oxide (IZO), sintered material of antimony oxide-tin oxide (ATO), and gallium-doped zinc oxide (GZO). Especially ITO and IZO are preferred because these have high electrical conductivity. The combinations of metal oxides in the upper and lower electrodes can have the same metal oxides as each other but the proportion of metal oxides different from each other.

Examples of the composite film mainly consisting of the metal oxide(s) include films obtained by dispersing the above-mentioned metal oxides in binder resin such as acrylic resin, urethane resin or epoxy resin.

When a thickness of the transparent conductive layer, depending upon the materials used therein, is too small, the transparent conductive layer cannot have sufficient conductivity. When the thickness is too large, the transparent conductive layer cannot have reduced resistivity not to give good response of the resultant touch panel, and suffers from increased cost for forming film and increased thickness of the transparent conductive film. Thus, the thickness of the transparent conductive layer preferably is in the range of 1 to 500 nm, especially 5 to 100 nm The transparent conductive layer can be formed by physical or chemical vapor deposition. Examples of the physical vapor deposition include vacuum metallizing process, sputtering process, ion-plating process, laser-ablation process. Examples of the chemical vapor deposition include atmospheric CVD process, decompression CVD process, and plasma CVD process.

The above-mentioned protective layer can be provided on the transparent conductive layer to increase the film strength for prevention of falling or peeling of the transparent conductive layer.

In the lower electrode, the second transparent conductive layer 4b can be superposed on a soda glass plate through a silicon oxide layer 13. The silicon oxide layer 13 is provided in order to prevent alkali components contained in the soda glass from eluting. Further the second transparent conductive layer 4b of the lower electrode may be bonded to the plastic plate 18 made of acrylic resin or polycarbonate through the undercoat layer 3b and the polymer film 2b.

In the invention, the materials and thickness of the polymer film 2a, 2b can use those described previously.

In case the polymer film is used in the lower electrode, the thickness of the polymer film can be set to the range more than the above range, for example in the range of 0.5 to 2 mm. However, the polymer film can also have the same thickness as in the upper electrode in the case of bonding the film to the plastic plate.

In the upper electrode of the touch panel of the invention, the hardcoat layer 1a, 1b can be formed on the reverse side (side having no transparent conductive layer) of the transparent conductive layer 4a, 4b of the polymer film 2a, 2b in order to protect the surface of the polymer film from damage by input with a pen or fingertip. The hardcoat layer can use materials mentioned previously. Further, the antireflection layer mentioned previously may be provided on the hardcoat layer.

Further, a surface of the hardcoat layer 1a can be processed by an antiglare processing, or an AR treatment for the purpose of the improvement of optical characteristics.

Moreover, the transparent conductive layer may be directly formed on the polymer film. However, the undercoat layer 3a, 3b may be provided between the polymer film 2a, 2b and the transparent conductive layer 4a, 4b, whereby the bonding strength between the polymer film 2a, 2b and the transparent conductive layer 4a, 4b can be enhanced to prevent the peeling of the transparent conductive layer 4a, 4b.

The materials and process for forming the undercoat layer 3a, 3b are as mentioned previously. The polymer film 2a, 2b may be subjected to plasma treatment, corona treatment or solvent washing treatment as described previously.

Materials of the (dot) spacers include thermosetting resin, light-curable resin. The spacers are generally formed by printing the above resin on the transparent conductive layer.

Materials of the adhesive layer 19a, 19b include acrylic resin, epoxy resin, phenol resin and silicone elastomer. When the thickness of the adhesive layer 19a, 19b bonding the upper electrode to the lower electrode is excessively thick, the pushing with a pen or fingertip does not bring about turning on electricity because an interval between the upper and lower electrodes is too increased, which makes it impossible to input to the touch panel. Excessively reduced thickness of the adhesive layer leads to frequent occurrence of input error because a small impact brings about turning on electricity. Hence the thickness preferably is in the range of 20 to 100 μm, especially 50 to 70 μm.

The transparent conductive film can be employed in uses described previously.

EXAMPLE

The invention is illustrated in detail using the following Examples.

Examples 1 to 3 and Comparison Example 1

First Invention (1) Preparation of Samples

On a PET film having thickness of 188 μm, a hardcoat agent (Z7501, available from JSR Co., Ltd) was coated using a bar coater, dried at 100° C. for five minutes to form a hardcoat layer 1a (before curing) having a dried thickness of 5 μm. The layer was exposed to a high-pressure mercury lamp (Irradiation strength: 80 mW/m$^2$, Integrating amount of light: 300 mJ/cm$^2$) to cure. On the reverse side of the PET film, a coating liquid having a composition set forth in Table 1 was coated using a bar coater, and dried at 100° C. for five minutes to form an undercoat layer (before curing) having a dried thickness of 5 μm. The layer was exposed to a high-pressure mercury lamp (Irradiation strength: 80 mW/m$^2$, Integrating amount of light: 300 mJ/cm$^2$) to cure.

Subsequently, ITO was placed as a target in a magnetron DC sputtering device, and the resultant PET film having the undercoat layer was placed in a vacuum chamber and then pressure of the chamber was reduced by a turbo molecular pump to $1 \times 10^{-4}$ Pa. Thereafter, Ar gas of 200 cc/min. and oxygen gas of 3 cc/min. were introduced into the chamber to adjust the chamber to 0.5 Pa, and then voltage was applied to the ITO target to form an ITO film having thickness of about 30 nm.

(2) Durability Test

An input pen (pen made of polyacetal; tip end: 0.8 R) carrying load of 250 g thereon was repeatedly ground 100,000 times on the hardcoat layer (reverse side of the transparent conductive layer) of the film whereby a grinding test was carried out. Then, the electrical characteristics (electrical resistivity) of the film is determined and estimated as follows:

"○ (Good)": rate of change of the resistivity after the test to that before the test is less than 30%;

"x (Poor)": rate of change of the resistivity after the test to that before the test is not less than 30%.

TABLE 1

|  |  | Example 1 | Example 2 | Example 3 | Com. Ex. 1 |
|---|---|---|---|---|---|
| Resin Composition (weight parts) | Urethane acrylate*1) | 100 | 100 | 100 | 100 |
|  | Acrylate monomer*2) | 5 | 5 | 5 | 5 |
|  | Photopolymerization initiator*3) | 2 | 2 | 2 | 2 |
|  | Amino-containing monomer*4) | 3 |  |  |  |
|  | Amino-containing monomer*5) |  | 3 |  |  |
|  | Phosphoric acid-containing monomer*6) |  |  | 3 |  |
| Result of Durability test | Change rate of resistivity | 20% | 23% | 15% | 35% |
|  | Estimation | ○ | ○ | ○ | x |

Remarks:
*1) U-4HA, available from Shin-Nakamura Chemical Co., Ltd
*2) A-NPG, available from Shin-Nakamura Chemical Co., Ltd
*3) Irgercure 184, available from Chiba Specialty Chemicals Ltd
*4) DMMA, available from Mitsubishi Rayon Co., Ltd
*5) KBE903, available from Shin-etsu Chemical Co., Ltd
*6) P1M, available from Kyoeisha Chemical Co., Ltd Table 1 shows that the transparent conductive layer of the invention is free from deterioration of electrical characteristics and shows excellent durability.

Hence, according to the first invention, the falling or peeling of the transparent conductive layer of the transparent conductive film is effectively prevented by provision of the undercoat layer containing a compound having at least one group of amino and phosphoric acid groups. Further by the transparent conductive film having the above undercoat layer, the touch panel having excellent durability can be obtained.

[Examples 4 to 7 and Comparison Example 2]

Second Invention (1) Preparation of Samples

On both sides of a PET film having thickness of 188 μm, a hardcoat agent (Z7501, available from JSR Co., Ltd) was coated using a bar coater, dried at 100° C. for five minutes to form a hardcoat layer 1a and an undercoat layer 3a (before curing) each having a dried thickness of 5 μm. The layer was exposed to a high-pressure mercury lamp (Irradiation strength: 80 mW/m$^2$, Integrating amount of light: 300 mJ/cm$^2$) to cure.

Subsequently, ITO was placed as a target in a magnetron DC sputtering device, and the resultant PET film having the undercoat layer was placed in a vacuum chamber and then pressure of the chamber was reduced by a turbo molecular pump to 5×10$^{-4}$ Pa. Thereafter, a mixture gas of Ar gas of 196 sccm (flowing amount) and oxygen gas of 4 sccm (flowing amount) was introduced into the chamber to adjust the chamber to 0.5 Pa, and then voltage of 2 kw was applied to the ITO target to form an ITO thin layer having surface resistivity of 500 Ω/□ (sq). A protective layer comprising a compound set forth in Table 2 having thickness set forth in Table 2 was formed on the ITO thin layer of the transparent conductive film.

(Film Forming Process in Examples 4 and 5)

A mixture of the materials in Table 2 was coated on the ITO thin layer using a bar coater, dried at 100° C. for five minutes to form a protective layer having thickness set forth in Table 2. The protective layer was exposed to a high-pressure mercury lamp (Irradiation strength: 80 mW/m$^2$, Integrating amount of light: 300 mJ/cm$^2$) to cure.

(Film Forming Process in Examples 6 and 7)

A mixture of the materials in Table 2 was coated on the ITO thin layer using a bar coater, dried at 80° C. for 30 minutes to form a protective layer having thickness set forth in Table 2. The protective layer was allowed to stand at room temperature for seven days, and then subjected to the durability test.

(2) Durability Test

An input pen (pen made of polyacetal; tip end: 0.8 R) carrying load of 250 g thereon was repeatedly ground 100,000 times on the hardcoat layer (reverse side of the transparent conductive layer) of the film whereby a grinding test was carried out. Then, the electrical characteristics (electrical resistivity) of the film is determined and estimated as follows:

"○ (Good)": rate of change of the resistivity after the test to that before the test is less than 30%;

"x (Poor)": rate of change of the resistivity after the test to that before the test is not less than 30%.

TABLE 2

|  |  | Ex. 4 | Ex. 5 | Ex. 6 | Ex. 7 | *Co. Ex. 2 |
|---|---|---|---|---|---|---|
| Resin Composition (weight parts) | Urethane acrylate*1) | 100 | 100 |  |  |  |
|  | Acrylate monomer*2) | 5 | 5 |  |  |  |
|  | Photopolymerization initiator*3) | 2 | 2 |  |  |  |
|  | Amino-containing alkoxy silane*4) |  |  | 100 | 100 |  |
| Thickness (nm) |  | 50 | 500 | 40 | 600 |  |
| Result of Durability test | Change rate of resistivity | 20% | 14% | 15% | 10% | 38% |
|  | Appearance | ○ | ○ | ○ | ○ | x |
| Total judgment |  | ○ | ○ | ○ | ○ | x |

Remarks:
*1) U-4HA, available from Shin-Nakamura Chemical Co., Ltd
*2) A-NPG, available from Shin-Nakamura Chemical Co., Ltd
*3) Irgercure 184, available from Chiba Specialty Chemicals Ltd
*4) KBP-40, available from Shin-etsu Chemical Co., Ltd
*Co. Ex. 2: having no protective layer Table 2 shows that the transparent conductive layer of the invention is free from deterioration of electrical characteristics and shows excellent durability.

Hence, according to the second invention, the falling or peeling of the transparent conductive layer of the transparent conductive film is effectively prevented by provision of the protective layer comprising polymeric compound, and the touch panel having excellent durability can be easily prepared.

Example 8 and Comparison Examples 3 and 4

Third Invention (1) Preparation of Samples

On a PET (polyethylene terephthalate) film having thickness of 125 μm, a UV-curable acrylic resin paint containing silica fine particles was coated, and the layer was exposed to a high-pressure mercury lamp (Irradiation strength: 80 mW/m$^2$, Integrating amount of light: 300 mJ/cm$^2$) to cure. Thus, the PET film having hardcoat layer (second polymer film) was obtained.

Subsequently, a PET film having thickness of 38 μm was subjected to plasma treatment under reduced pressure. The plasma treatment was carried out for 10 minutes under the conditions of reduced pressure (13.3 Pa) and voltage of 100 W using high-frequency electrical source (13.56 MHz) while argon gas of 100 ml/min. was flowed. Thereafter, in a magnetron-sputtering device, silicon as target was sputtered onto the treated surface of the PET film to form a thin layer (an undercoat layer) of silicon compound having a thickness of 10 nm. Further, in the magnetron-sputtering device, tin oxides (10 wt. %)-containing ITO plate as target was sputtered onto the thin layer under the following conditions to form a transparent conductive layer of ITO having a thickness of 20 nm. Thus, the transparent conductive film was obtained.

The formation of the ITO layer by the magnetron-sputtering device was carried out for 60 seconds under the conditions of the amount of flowing argon of 50 cc/min., the amount of flowing oxygen of 3 cc/min., reduced pressure of 0.6 Pa, DC electric power of 2 kW and the revolution rate of the plate of 10 rpm.

Subsequently, a 15 weight % solution of ethylene/vinyl acetate copolymer (Ultrasene 710, available from Toso Co., Ltd, content of vinyl acetate: 28 weight %) in toluene was prepared. 0.5 weight % of 1,1-bis(t-butylperoxy)-3,3,5-trimethylcyclohexane, 2.0 weight % of glycidyl methacrylate and 0.5 weight % of γ-methacryloxypropyltrimethoxysilane, based on the ethylene/vinyl acetate copolymer, were added to the solution, and sufficiently mixed. The resultant coating liquid was coated on the PET film (width: 250 mm; thickness: 125 μm) having hardcoat layer (5 μm) using a bar coater to form an adhesive layer.

Subsequently, the PET film having hardcoat layer and the adhesive layer was superposed to the transparent conductive film (38 μm) through the adhesive layer, and heated at 130° C. under pressure of 10 kg/cm² for 10 minutes. Thus a transparent conductive film for a touch panel was obtained.

The thermo-crosslinked EVA (ethylene/vinyl acetate copolymer) thermo-crosslinkable adhesive layer, which was prepared by heating under pressure as above, had modulus of elasticity of $4.5 \times 10^4$ Pa.

Comparison Example 3

In Example 8, a transparent conductive film for a touch panel was obtained in the same manner except that the resultant PET film having hardcoat layer and the transparent conductive film were bonded to each other using an adhesive layer of a crosslinked epoxy adhesive (modulus of elasticity of $2.5 \times 10^7$ Pa).

Comparison Example 4

In Example 8, a transparent conductive film for a touch panel was obtained in the same manner except that the PET film having hardcoat layer and the transparent conductive film were bonded to each other using an adhesive layer of a crosslinked urethane adhesive (modulus of elasticity of $2.5 \times 10^7$ Pa).

(Durability Test)

An input pen (pen made of polyacetal; tip end: 0.8 R) carrying load of 250 g thereon was repeatedly ground 100,000 times on the hardcoat layer (reverse side of the transparent conductive layer) of the film whereby a grinding test was carried out.

(1) Adhesion (Bonding Strength)

After the test, whether the PET film was peeled from the adhesive layer was observed and estimated as follows:

"Good": peeling was not observed;
"Poor": peeling was apparently observed.

(2) Change Rate of Electrical Resistivity

After the test, the electrical characteristics (electrical resistivity) of the film was determined and estimated as follows:

"Good": rate of change of the resistivity after the test to that before the test is less than 50%;
"Poor": rate of change of the resistivity after the test to that before the test is not less than 50%.

TABLE 3

|  | Example 8 | Com. Ex. 3 | Com. Ex. 4 |
|---|---|---|---|
| Change rate of resistivity | Good | Poor | Poor |
| Adhesion | Good | Poor | Poor |

Table 3 shows that the transparent conductive layer of the invention is free from separation (peeling) between the PET film and the adhesive layer and deterioration of electrical characteristics and hence the touch panel using transparent conductive layer as the upper electrode also shows excellent durability Thus, in the transparent conductive film and touch panel according to the invention, the falling or peeling of the transparent conductive layer of the transparent conductive film is effectively prevented even if input by a pen or fingertip is repeatedly carried out on the surface of the transparent conductive layer (upper electrode). Therefore in the film and the touch panel, the uniformity of electrical resistivity is maintained and hence excellent durability can be obtained.

Examples 9 to 12 and Comparison Example 5

Forth Invention

On one side of a PET film having thickness of 188 μm, a hardcoat layer of a thickness of 5 μm was formed by coating method using a solvent. The resultant film was cut to a size of 100×100 mm, and the surface having no hardcoat layer of the film was subjected to plasma treatment under reduced pressure. The plasma treatment was carried out for 10 minutes under the conditions of reduced pressure (13.3 Pa) and voltage of 100 W using high-frequency electric source (13.56 MHz) while argon gas of 100 ml/min. was flowed.

Subsequently, in the magnetron-sputtering device, tin oxide (10 wt. %)-containing ITO target was sputtered onto the treated surface under the conditions of the amount of flowing argon of 50 ml/min. and the amount of flowing oxygen of 2 ml/min. to form a transparent conductive layer of ITO having a thickness of 20 nm. Further, on the ITO layer (thin layer), another ITO layer was formed using the above magnetron-sputtering device and the target material under the conditions (shown in Table 4) different from those in the formation of the above ITO thin layer. Another ITO thin layer had different properties from the former ITO thin layer.

A lower electrode was prepared as follows:

ITO was placed as a target in a magnetron DC sputtering device, and a soda glass plate having thickness of 1.1 mm was placed in a vacuum chamber, and then pressure of the chamber was reduced by a turbo molecular pump to $5 \times 10^{-4}$ Pa. Thereafter, a mixture gas of Ar gas of 196 sccm (flowing amount) and oxygen gas of 4 sccm (flowing amount) was introduced into the chamber to adjust the pressure of the chamber to 0.5 Pa, and then voltage of 4 kw was applied to the ITO target to form an ITO thin layer having surface resistivity of 500 Ω/□ (sq). Dot spacers were printed on the ITO thin layer and cured to form the lower electrode.

The above transparent conductive film was used as an upper electrode, and the upper and lower electrodes were subjected to etching treatment to form the electrodes having predetermined shape. Lead wiring was formed on the edges of the upper and lower electrodes using Ag paste. The upper and lower electrodes were arranged such that both of the transparent conductive layers were faced to each other and the electrodes were bonded to each other on the circumferences using an adhesive to prepare a touch panel. The thickness of the adhesive layer was 60 μm.

(Durability Test)

Subsequently, the resultant films were subjected to durability test by grinding writing. An input pen carrying load of 250 g thereon was repeatedly ground 100,000 times on the film whereby a grinding test was carried out. After the test, the electrical characteristics (electrical resistivity) of the film was determined and the durability was estimated as follows:

"OK": rate of change of the resistivity after the test to that before the test is less than 50%;
"NG": rate of change of the resistivity after the test to that before the test is not less than 50%.

The results were shown in Table 4.

Comparison Example 5

In Example 9, a transparent conductive film for a touch panel was obtained in the same manner except that the transparent conductive film had only one ITO thin layer.

The formation of the one ITO film by the magnetron-sputtering device was carried out under the conditions of the amount of flowing argon of 50 cc/min., the amount of flowing oxygen of 3 cc/min., reduced pressure of 0.5 Pa, DC electric power of 2 kW, and film-forming time of 60 sec. under the condition of the revolution rate of the plate of 10 rpm.

A lower electrode was prepared as follows:

ZAO was placed as a target in a magnetron DC sputtering device, and a soda glass plate having thickness of 1.1 mm was placed in a vacuum chamber, and then pressure of the chamber was reduced by a turbo molecular pump to $5 \times 10^{-4}$ Pa. Thereafter, a mixture gas of Ar gas of 196 sccm (flowing amount) and oxygen gas of 4 sccm (flowing amount) was introduced into the chamber to adjust the pressure of the chamber to 0.5 Pa, and then voltage of 4 kw was applied to the ZAO target to form an ZAO thin layer having surface resistivity of 500 Ω/□ (sq). Dot spacers were printed on the ZAO thin layer and cured to form the lower electrode.

TABLE 4

| | Pressure (Pa) | DC Electric Power (W) | Amount of Ar (ml/min) | Amount of $O_2$ (ml/min) | Amount of $N_2$ (ml/min) | Thickness (nm) | Difference between the lower and upper ITOs | Durability |
|---|---|---|---|---|---|---|---|---|
| Ex. 9 | 0.5 | 2 kW | 50 | 10 | — | 10 | $O_2$*1) | OK |
| Ex. 10 | 0.5 | 2 kW | 50 | 3 | 5 | 10 | $N_2$*2) | OK |
| Ex. 11 | 4.0 | 2 kW | 50 | 3 | — | 10 | Roughness*3) | OK |
| Ex. 12 | 0.5 | 10 kW | 50 | 3 | — | 10 | Roughness*3) | OK |
| Co. Ex. 5 | — | — | — | — | — | — | — | NG |

Note:
*1) the upper ITO containing increased $O_2$ compared as the lower ITO;
*2) the upper ITO containing $N_2$ while the lower ITO containing no $N_2$;
*3) the upper ITO having increased roughness compared as the lower ITO.

As apparent from above, in the formation of the transparent conductive layer of the upper electrode, the provision of a usual metal oxide layer and another metal oxide layer different in the composition or surface shape (surface roughness) from the usual metal oxide layer on the usual metal oxide layer according to the invention brings about a transparent conductive film in which falling and peeling from the electrode can be prevented and fusing between the upper and lower electrodes can be prevented, and which has good grinding resistance and excellent durability.

Examples 13 to 16 and Comparison Example 6

Forth Invention Similarly

On one side of a PET film having thickness of 188 μm, a hardcoat layer of a thickness of 5 μm was formed by coating method using a solvent. The resultant film was cut to a size of 100×100 mm, and the surface having no hardcoat layer of the film was subjected to plasma treatment under reduced pressure. The plasma treatment was carried out for 10 minutes under the conditions of reduced pressure (13.3 Pa) and voltage of 100 W using high-frequency electric source (13.56 MHz) while argon gas of 100 ml/min. was flowed.

Subsequently, in the magnetron-sputtering device, aluminum oxide (2 wt. %)-containing ZAO target was sputtered onto the treated surface under the conditions of the amount of flowing argon of 50 ml/min. and the amount of flowing oxygen of 2 ml/min. to form a transparent conductive layer of ZAO having a thickness of 20 nm. Further, on the ZAO layer (thin film), another ZAO layer was formed using the above magnetron-sputtering device and the target material under the conditions (shown in Table 5) different from those in the formation of the above ZAO thin layer. The latter ZAO thin layer had different properties from the former ZAO thin layer.

The above transparent conductive film was used as an upper electrode, and the upper and lower electrodes were subjected to etching treatment to form the electrodes having predetermined shape. Lead wiring was formed on the edges of the upper and lower electrodes using Ag paste. The upper and lower electrodes were arranged such that both of the transparent conductive layers were faced to each other and the electrodes were bonded to each other on the circumferences using an adhesive to prepare a touch panel. The thickness of the adhesive layer was 60 μm.

(Durability Test)

Subsequently, the resultant films were subjected to durability test by grinding writing. An input pen carrying load of 250 g thereon was repeatedly ground 100,000 times on the film, and thus a grinding test was carried out. After the test, the electrical characteristics (electrical resistivity) of the film was determined and the durability was estimated as follows:

"OK": rate of change of the resistivity after the test to that before the test is less than 50%;

"NG": rate of change of the resistivity after the test to that before the test is not less than 50%.

The results were shown in Table 5.

Comparison Example 6

In Example 13, a transparent conductive film for a touch panel was obtained in the same manner except that the transparent conductive film had only one ZAO thin layer.

The formation of the one ZAO film by the magnetron-sputtering device was carried out under the conditions of the amount of flowing argon of 50 cc/min., the amount of flowing oxygen of 3 cc/min., reduced pressure of 0.5 Pa, DC electric power of 2 kW, and film-forming time of 60 sec. under the condition of the revolution rate of the plate of 10 rpm.

TABLE 5

|  | Pressure (Pa) | DC Electric Power (W) | Amount of Ar (ml/min) | Amount of O$_2$ (ml/min) | Amount of N$_2$ (ml/min) | Thickness (nm) | Difference between the lower and upper ZAOs | Durability |
|---|---|---|---|---|---|---|---|---|
| Ex. 13 | 0.5 | 2 kW | 50 | 10 | — | 10 | O$_2$*1) | OK |
| Ex. 14 | 0.5 | 2 kW | 50 | 3 | 5 | 10 | N$_2$*2) | OK |
| Ex. 15 | 4.0 | 2 kW | 50 | 3 | — | 10 | Roughness*3) | OK |
| Ex. 16 | 0.5 | 10 kW | 50 | 3 | — | 10 | Roughness*3) | OK |
| Co. Ex. 6 | — | — | — | — | — | — | — | NG |

Note:
*1) the upper ZAO containing increased O$_2$ compared as the lower ZAO;
*2) the upper ZAO containing N$_2$ while the lower ZAO containing no N$_2$;
*3) the upper ZAO having increased roughness compared as the lower ZAO.

As apparent from above, the invention facilitates the control of the thickness and resistivity of the transparent conductive film. Further, in the formation of the transparent conductive layer of the upper electrode, the provision of a ZAO layer and another metal oxide layer different in the composition or surface shape (surface roughness) from the former ZAO layer on the former ZAO layer according to the invention brings about a transparent conductive film in which falling and peeling from the electrode and fusing between the upper and lower electrodes can be prevented, and which has good grinding resistance and excellent durability.

Examples 17 to 20 and Comparison Example 7

Forth Invention Similarly

On one side of a PET film having thickness of 188 μm, a hardcoat layer of a thickness of 5 μm was formed by coating method using a solvent. The resultant film was cut to a size of 100×100 mm, and the surface having no hardcoat layer of the film was subjected to plasma treatment under reduced pressure. The plasma treatment was carried out for 10 minutes under the conditions of reduced pressure (13.3 Pa) and voltage of 100 W using high-frequency electric source (13.56 MHz) while argon gas of 100 ml/min. was flowed.

Subsequently, in the magnetron-sputtering device, antimony oxide (10 wt. %)-containing ATO target was sputtered onto the treated surface under the conditions of the amount of flowing argon of 50 ml/min. and the amount of flowing oxygen of 2 ml/min. to form a transparent conductive layer of ATO having a thickness of 20 nm. Further, on the ITO layer (thin film), another ITO layer was formed using the above magnetron-sputtering device and materials under the conditions (shown in Table 6) different from those in the formation of the above ATO thin layer. The latter ATO thin layer had different properties from the former ATO thin layer.

A lower electrode was prepared as follows:

ATO was placed as a target in a magnetron DC sputtering device, and a soda glass plate having thickness of 1.1 mm was placed in a vacuum chamber and then pressure of the chamber was reduced by a turbo molecular pump to 5×10$^{-4}$ Pa. Thereafter, a mixture gas of Ar gas of 196 sccm (flowing amount) and oxygen gas of 4 sccm (flowing amount) was introduced into the chamber to adjust the pressure of the chamber to 0.5 Pa, and then voltage of 4 kw was applied to the ATO target to form an ATO thin layer having surface resistivity of 500 Ω/☐ (sq). Dot spacers were printed on the ATO thin layer and cured to form the lower electrode.

The above transparent conductive film was used as an upper electrode, and the upper and lower electrodes were subjected to etching treatment to form the electrodes having predetermined shape. Lead wiring was formed on the edges of the upper and lower electrodes using Ag paste. The upper and lower electrodes were arranged such that both of the transparent conductive layers were faced to each other and the electrodes were bonded to each other on the circumferences using an adhesive to prepare a touch panel. The thickness of the adhesive layer was 60 μm.

(Durability Test)

Subsequently, the resultant films were subjected to durability test by grinding writing. An input pen carrying load of 250 g thereon was repeatedly ground 100,000 times on the film, and thus a grinding test was carried out. After the test, the electrical characteristics (electrical resistivity) of the film was determined and the durability was estimated as follows:

"OK": rate of change of the resistivity after the test to that before the test is less than 50%;

"NG": rate of change of the resistivity after the test to that before the test is not less than 50%.

The results were shown in Table 6.

Comparison Example 7

In Example 17, a transparent conductive film for a touch panel was obtained in the same manner except that the transparent conductive film had only one ATO thin layer.

The formation of the one ATO film by the magnetron-sputtering device was carried out under the conditions of the amount of flowing argon of 50 cc/min., the amount of flowing oxygen of 3 cc/min., reduced pressure of 0.5 Pa, DC electric power of 2 kW, and film-forming time of 60 sec. under the condition of the revolution rate of the plate of 10 rpm.

TABLE 6

| | Pressure (Pa) | DC Electric Power (W) | Amount of Ar (ml/min) | Amount of O$_2$ (ml/min) | Amount of N$_2$ (ml/min) | Thickness (nm) | Difference between the lower and upper ATOs | Durability |
|---|---|---|---|---|---|---|---|---|
| Ex. 17 | 0.5 | 2 kW | 50 | 10 | — | 10 | O$_2$*1) | OK |
| Ex. 18 | 0.5 | 2 kW | 50 | 3 | 5 | 10 | N$_2$*2) | OK |
| Ex. 19 | 4.0 | 2 kW | 50 | 3 | — | 10 | Roughness*3) | OK |
| Ex. 20 | 0.5 | 10 kW | 50 | 3 | — | 10 | Roughness*3) | OK |
| Co. Ex. 7 | — | — | — | — | — | — | — | NG |

Note:
*1) the upper ATO containing increased O$_2$ compared as the lower ATO;
*2) the upper ATO containing N$_2$ while the lower ATO containing no N$_2$;
*3) the upper ATO having increased roughness compared as the lower ATO.

As apparent from above, the invention facilitates the control of the thickness and resistivity of the transparent conductive film. Further, in the formation of the transparent conductive layer of the upper electrode, the provisions of a ATO layer and another metal oxide layer different in the composition or surface shape (surface roughness) from the former ATO layer on the former ATO layer according to the invention bring about a low-priced transparent conductive film in which falling and peeling from the electrode and fusing between the upper and lower electrodes can be prevented, and which has good grinding resistance and excellent durability.

Examples 21 and Comparison Example 8

Fifth Invention (1) Preparation of Samples

A surface of a PET film having thickness of 38 μm was subjected to plasma treatment for 10 minutes under the conditions of reduced pressure (13.3 Pa) and voltage of 100 W using high-frequency electric source (13.56 MHz) while argon gas of 100 ml/min. was flowed. Thereafter, in a magnetron-sputtering device, silicon as target was sputtered onto the treated surface of the PET film to form a thin layer (an undercoat layer) of silicon compound having a thickness of 10 nm. Further, in the magnetron-sputtering device, tin oxides (10 wt. %)-containing ITO plate as target was sputtered onto the thin layer under the following conditions to form a transparent conductive layer of ITO having a thickness of 20 nm. Thus, the transparent conductive film was obtained.

The formation of the ITO layer by the magnetron-sputtering device was carried out for 60 seconds under the conditions of the amount of flowing argon of 50 cc/min., the amount of flowing oxygen of 3 cc/min., reduced pressure of 0.5 Pa, DC electric power of 2 kW and the revolution rate of the plate of 10 rpm.

Subsequently, a 15 weight % solution of ethylene/vinyl acetate copolymer (Ultrasene 710, available from Toso Co., Ltd, content of vinyl acetate: 28 weight %) in toluene was prepared. 0.5 weight % of 1,1-bis(t-butylperoxy)-3,3,5-trimethylcyclohexane, 2.0 weight % of glycidyl methacrylate and 0.5 weight % of γ-methacryloxypropyltrimethoxysilane, based on the ethylene/vinyl acetate copolymer, were added to the solution, and sufficiently mixed. The resultant coating liquid was coated on the surface having no transparent conductive layer, and the PET film was placed in a injection molding machine such that the transparent conductive layer is faced to the mold surface of the molding machine, and then PMMA (polymethyl methacrylate) resin was injected into the molding machine and maintained at 130° C. for five minutes to be taken out. Thus a transparent conductive plate for touch panel was obtained.

The thermo-crosslinked EVA (ethylene/vinyl acetate copolymer) thermo-crosslinkable adhesive layer, which was crosslinked by heating as above, had modulus of elasticity of $4.5 \times 10^4$ Pa.

Comparison Example 8

In Example 21, a transparent conductive plate for touch panel was obtained in the same manner except that the PMMA resin (plate) and the transparent conductive film were bonded to each other by a crosslinked adhesive layer of urethane adhesive (modulus of elasticity of $2.5 \times 10^7$ Pa).

(Durability Test)

The transparent conductive film as a upper electrode was superposed on the transparent conductive plate, and was subjected to the following grinding writing test.

An input pen (pen made of polyacetal; tip end: 0.8 R) carrying load of 250 g thereon was repeatedly ground 100,000 times on the surface of the transparent conductive layer.

(1) Adhesion (Bonding Strength)

After the test, whether the PET film was peeled from the adhesive layer was observed and estimated as follows:

"Good": peeling was not observed;

"Poor": peeling was apparently observed.

(2) Change Rate of Electrical Resistivity

After the test, the electrical characteristics (electrical resistivity) of the film was determined and estimated as follows:

"Good": rate of change of the resistivity after the test to that before the test is less than 50%;

"Poor": rate of change of the resistivity after the test to that before the test is not less than 50%.

TABLE 7

| | Example 21 | Com. Ex. 8 |
|---|---|---|
| Change rate of resistivity | Good | Poor |
| Adhesion | Good | Poor |

Table 7 shows that the transparent conductive plate of the invention has excellent durability because there is no separation (peeling) between the PET film and the adhesive layer even if is used for long-term and there is no deterioration of electrical characteristics after the grinding test, and hence a touch panel using the plate as a lower electrode also has excellent durability. In order to compare in impact resistance a commercially available transparent conductive plate (comparison example 8) prepared by bonding a transparent conductive film to a glass plate with the plastic plate of Example 21, both of the plates were allowed to fallen on a surface of concrete from height of 1 m. As a result, only the commercially available plate was broken. Further the plate showed poor durability in the test durability.

Hence, in the transparent conductive plate and touch panel having this plate according to the invention, the falling or peeling of the transparent conductive layer of the transparent conductive film scarcely occur even if input by a pen or fingertip was repeatedly carried out on the surface of the transparent conductive layer (upper electrode) and therefore the uniformity of electrical resistivity is maintained and hence excellent durability can be obtained.

Examples 22 and 23 and Comparison Examples 9 and 10

Sixth Invention (1) Process for Preparing Electrodes (a) Upper Electrode 1

ITO was set as a target in a magnetron DC sputtering device, and a PET film having thickness of 188 μm whose one side was coated with a UV-curable acrylate type hardcoat was set in a vacuum chamber. Subsequently, the pressure of the vacuum chamber was reduced by a turbo molecular pump to $5 \times 10^{-4}$ Pa, and then a mixture gas of Ar gas of 196 sccm (flowing amount) and oxygen gas of 4 sccm (flowing amount) was introduced into the vacuum chamber to adjust the pressure of the chamber to 0.5 Pa. Thereafter, voltage of 4 kw was applied to the ITO target to form an ITO thin layer having surface resistivity of 500 Ω/□ (sq) on the side having no hardcoat of the PET film.

(b) Upper Electrode 2

IZO was set as a target in a magnetron DC sputtering device, and a PET film having thickness of 188 μm whose one side was coated with a LV-curable acrylate type hardcoat was set in a vacuum chamber. Subsequently, the pressure of the vacuum chamber was reduced by a turbo molecular pump to $5 \times 10^{-4}$ Pa, and then a mixture gas of Ar gas of 196 sccm (flowing amount) and oxygen gas of 4 sccm (flowing amount) was introduced into the vacuum chamber to adjust the pressure of the vacuum chamber to 0.5 Pa. Thereafter, voltage of 4 kw was applied to the IZO target to form an IZO thin layer having surface resistivity of 500 Ω/□ (sq) on the side having no hardcoat of the PET film.

(c) Lower Electrode 1

ITO was set as a target in a magnetron DC sputtering device, and a soda glass having a thickness of 1.1 mm whose both sides were provided with a silicon oxide layer by dipping method was set in a vacuum chamber. Subsequently, the pressure of the device was reduced by a turbo molecular pump to $5 \times 10^{-4}$ Pa, and then a mixture gas of Ar gas of 196 sccm (flowing amount) and oxygen gas of 4 sccm (flowing amount) was introduced into the vacuum chamber to adjust the pressure of the vacuum chamber to 0.5 Pa. Thereafter, voltage of 4 kw was applied to the ITO target to form an ITO thin layer having surface resistivity of 1,000 Ω/□ (sq) on the side having no hardcoat of the glass. Dot spacers were printed on the ITO thin layer and cured.

(d) Lower Electrode 2

IZO was set as a target in a magnetron DC sputtering device, and a soda glass having a thickness of 1.1 mm whose both sides were provided with a silicon oxide layer by dipping method was set in a vacuum chamber. Subsequently, the pressure of the device was reduced by a turbo molecular pump to $5 \times 10^{-4}$ Pa, and then a mixture gas of Ar gas of 196 sccm (flowing amount) and oxygen gas of 4 sccm (flowing amount) was introduced into the vacuum chamber to adjust the pressure of the vacuum chamber to 0.5 Pa. Thereafter, voltage of 4 kw was applied to the IZO target to form an IZO thin layer having surface resistivity of 1,000 Ω/□ (sq) on the side having no hardcoat of the glass. Dot spacers were printed on the ITO thin layer and cured.

(2) Process for Preparing Touch Panel

The upper and lower electrodes were subjected to etching treatment to form the electrodes having predetermined shape. Lead wiring was formed on the edges of the upper and lower electrodes using Ag paste. The upper and lower electrodes were arranged such that both of the transparent conductive layers were faced to each other and the electrodes were bonded to each other on the circumferences using an adhesive to prepare a touch panel. The thickness of the adhesive layer was 60 μm.

(3) Estimation

Durability Test

An input pen (pen made of polyacetal; tip end: 0.8 R) carrying load of 250 g thereon was repeatedly ground 100,000 times on the hardcoat layer (reverse side of the transparent conductive layer) of the film whereby a grinding test was carried out. Then, the electrical characteristics (electrical resistivity) of the film is determined and estimated as follows:

"○ (Good)": linearity after the test is less than 0.5%;

"x (Poor)": linearity after the test is not less than 30%.

Further, the appearance of the film is estimated as follows:

"○ (Good)": there is no difference between appearance after the test and that before the test;

"x (Poor)": there is difference between appearance after the test and that before the test.

The linearity is index indicating the uniformity of resistivity of the transparent conductive layer. It can be determined as follows: Terminals of silver paste are formed on two sides of the upper and lower electrodes faced to each other, and direct current is applied between both of the terminals. The linearity is defined in the following equation:

$$\text{Linearity (\%)} = |(I/L - v/V)| \times 100$$

In which L is that the distance between both of the electrodes and V is the applied voltage, and, under these conditions, I is the distance from an optional point of the transparent conductive layer to a minus terminal, and v is potential difference between the point and the minus terminal. The linearity the smaller, more excellent is the uniformity of resistivity of the transparent conductive layer, and the linearity of 0% represents compete uniformity of the resistivity. The analog-type touch panel according to usual resistance sensitive system preferably has the linearity of not more than 1.5%.

(4) Examples and Comparison Examples

Example 22

A touch panel was prepared by using the upper electrode 1 and the lower electrode 2.

Example 23

A touch panel was prepared by using the upper electrode 2 and the lower electrode 1.

Comparison Example 9

A touch panel was prepared by using the upper electrode 1 and the lower electrode 1.

Comparison Example 10

A touch panel was prepared by using the upper electrode 2 and the lower electrode 2.

(5) The obtained results were shown in Table 8.

TABLE 8

|  |  | Example 22 | Example 23 | Com. Ex. 9 | Com. Ex. 10 |
|---|---|---|---|---|---|
| Result of Durability test | Linearity | 1.0% | 0.8% | 15.5% | 17.0% |
|  | Appearance | ○ | ○ | x | x |
| Synthetic judgment |  | ○ | ○ | x | x |

Note:
In "x" in the appearance, falling of the transparent conductive layer of the upper electrode was observed.

As apparent from above, according to the invention, physical and chemical affinity between the upper and lower electrodes is interrupted by the use different materials in the transparent conductive layer of the upper and lower electrodes and hence the falling or peeling of the transparent conductive layer of the transparent conductive film is effectively prevented. Thus, the touch panel which is free from deterioration of electrical characteristics and shows excellent durability and further can be easily prepared, can be obtained.

[Description of Reference Number]

1, 1a, 1b: hardcoat layer
2, 2a, 2b, 2c, 2d: polymer film
3, 3a, 3b: undercoat layer
4, 4a, 4b, 14, 14a: transparent conductive layer
5, 5a, 5b: spacers
6: adhesive layer
7: transparent plate

What is claimed is:

1. A transparent conductive film, which comprises a polymer film having a transparent conductive layer thereon through an undercoat layer and another polymer film having a hardcoat layer thereon, the two polymer films being bonded to each other through an adhesive layer comprising polyolefin resin such that a surface having no transparent conductive layer of the polymer film and a surface having no hardcoat layer of another polymer film face each other,
wherein the undercoat layer is formed from a photo-curable resin containing a compound having at least one selected from an amino group and a phosphoric acid group,
wherein the transparent conductive layer comprises at least one compound selected from indium oxide, tin oxide, zinc oxide, indium oxide-tin oxide (ITO), antimony oxide-tin oxide (ATO) and zinc oxide-aluminum oxide (ZAO), and
wherein a protective layer comprising a polymeric compound is provided on the transparent conductive layer.

2. A transparent conductive film as defined in claim 1, wherein the polyolefin resin of the adhesive layer comprises copolymer of ethylene and vinyl acetate and/or (meth)acrylate.

3. A transparent conductive film as defined in claim 1, wherein the polyolefin resin of the adhesive layer comprises a film formed by curing copolymer of ethylene and vinyl acetate and/or (meth)acrylate.

4. A transparent conductive film as defined in claim 1, wherein the transparent conductive layer comprises a first transparent conductive layer comprising a first metal oxide and a second transparent conductive layer comprising a second metal oxide, and the second transparent conductive layer is formed under the condition different from the condition for forming the first transparent conductive layer.

5. A transparent conductive film as defined in claim 4, wherein the first and second transparent conductive layers comprise indium oxide-tin oxide (ITO), zinc oxide-aluminum oxide (ZAO) or antimony oxide-tin oxide (ATO).

6. A transparent conductive film as defined in claim 4 or 5, wherein the first and second transparent conductive layers are formed by a vapor deposition process selected from a sputtering process and a reactive sputtering process.

7. A transparent conductive film as defined in claim 6, wherein target material used in the vapor deposition process is a ceramic target formed by sintering mixed metal oxides or an alloy target made of metal oxide.

8. A transparent conductive film as defined in claim 4 wherein the second transparent conductive layer comprising the second metal oxide is different from the first transparent conductive layer comprising the first metal oxide in at least one selected from oxygen content, nitrogen content, crystalline state and surface shape.

9. A transparent conductive film as defined in claim 8, wherein the condition for forming the second transparent conductive layer comprising the second metal oxide by a sputtering process is different in pressure and deposition rate in the sputtering from that for forming the first transparent conductive layer comprising the first metal oxide.

10. A transparent conductive film as defined in claim 1, wherein the photo-curable resin comprises (meth)acrylate monomer, (meth)acrylate oligomer, and a photopolymerization initiator.

11. A transparent conductive film as defined in claim 1, wherein the photo-curable resin comprises (meth)acrylate monomer, urethane (meth)acrylate oligomer, and a photopolymerization initiator.

12. A transparent conductive film as defined in claim 1, wherein a hardcoat layer is provided on a surface having no transparent conductive layer of the polymer film.

13. A transparent conductive film as defined in claim 1, wherein the compound having amino group is derived from a compound selected from dialkylaminoalkyl methacrylate and a silane-coupling agent having an amino group, and the compound having phosphoric acid group is derived from a compound selected from 2-methacryloyloxyethyl phosphate and diphenyl-2-methacryloyloxyethyl phosphate.

14. A transparent conductive film as defined in claim 1, wherein the polymer film comprises polyethylene terephthalate.

15. A transparent conductive film as defined in claim 1, wherein the polymeric compound is a resin composition containing at least one resin selected from acrylic resin, polyester resin, epoxy resin, urethane resin, phenol resin, maleic acid resin, melamine resin, urea resin, polyimide resin and silicon-containing resin.

16. A transparent conductive film as defined in claim 1, wherein the protective layer comprises a film formed by curing amino-containing alkoxy-silane.

17. A transparent conductive film as defined in claim 1, wherein the protective layer comprises a film formed by curing UV-curable resin.

18. A touch panel comprising an upper electrode having a hard coat layer, a first polymer film, a first undercoat layer and a first transparent conductive layer superposed in this order, and a lower electrode having a plastic or glass plate, a second polymer film, a second undercoat layer and a second transparent conductive layer superposed in this order, the upper electrode and the lower electrode being bonded to each other through spacers such that both of the transparent conductive layers face each other, wherein for at least one of the upper electrode and the lower electrode:

the undercoat layer is formed from a photo-curable resin containing a compound having at least one selected from an amino group and a phosphoric acid group, the transparent conductive layer comprises at least one compound selected from indium oxide, tin oxide, zinc oxide, indium oxide-tin oxide (ITO), antimony oxide-tin oxide (ATO) and zinc oxide-aluminum oxide (ZAO), and a protective layer comprising a polymeric compound is provided on the transparent conductive layer.

19. A touch panel as defined in claim 18, wherein the lower electrode has a transparent plate, an adhesive layer, a polymer film and a second transparent conductive layer superposed in this order, and the adhesive layer comprises polyolefin resin.

20. A touch panel as defined in claim 18 or 19, wherein the first transparent conductive layer of the upper electrode is formed from material different from that of the second transparent conductive layer of the lower electrode.

21. A touch panel as defined in claim 20, wherein the first transparent conductive layer and the second transparent conductive layer are a film of metal oxide, a film of combination of two or more metal oxides or a composite film consisting essentially of metal oxide, or a film comprising gold, copper, nickel, aluminum or palladium.

22. A touch panel as defined in claim 18, wherein the compound having amino group is derived from a compound selected from dialkylaminoalkyl methacrylate and a silane-coupling agent having an amino group, and the compound having phosphoric acid group is derived from a compound selected from 2-methacryloyloxyethyl phosphate and diphenyl-2-methacryloyloxyethyl phosphate.

23. A touch panel as defined in claim 18, wherein the polymer film comprises polyethylene terephthalate.

24. A touch panel as defined in claim 18, wherein the polymeric compound is a resin composition containing at least one resin selected from acrylic resin, polyester resin, epoxy resin, urethane resin, phenol resin, maleic acid resin, melamine resin, urea resin, polyimide resin and silicon-containing resin.

25. A touch panel as defined in claim 18, wherein the protective layer comprises a film formed by curing amino-containing alkoxy-silane.

26. A touch panel as defined in claim 18, wherein the protective layer comprises a film formed by curing UV-curable resin.

* * * * *